(12) United States Patent
Poirier et al.

(10) Patent No.: US 6,321,372 B1
(45) Date of Patent: Nov. 20, 2001

(54) EXECUTABLE FOR REQUESTING A LINGUISTIC SERVICE

(75) Inventors: Herve Poirier; Nelly Tarbouriech, both of Meylan; Gilbert Harrus, Grenoble, all of (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/221,232

(22) Filed: Dec. 23, 1998

(51) Int. Cl.$^7$ ........................................................ G06F 9/45
(52) U.S. Cl. ..................................... 717/1; 717/4; 717/11; 704/2; 704/8; 704/9
(58) Field of Search ......................... 717/1, 11, 4; 704/2, 704/8, 9

(56) References Cited

U.S. PATENT DOCUMENTS

| | | | |
|---|---|---|---|
| 4,706,212 | * 11/1987 | Toma | 704/2 |
| 4,914,590 | * 4/1990 | Loatman et al. | 704/8 |
| 5,079,701 | * 1/1992 | Kuga et al. | 704/10 |
| 5,111,398 | * 5/1992 | Nunberg et al. | 704/9 |
| 5,233,513 | * 8/1993 | Doyle | 705/7 |
| 5,321,803 | * 6/1994 | Ditter, Jr. | 395/335 |
| 5,607,310 | * 3/1997 | Cholley | 434/157 |
| 5,640,576 | * 6/1997 | Kobayashi et al. | 704/9 |
| 5,748,975 | * 5/1998 | Vanter | 707/531 |
| 5,768,603 | * 6/1998 | Brown et al. | 704/9 |
| 5,794,177 | * 8/1998 | Carus et al. | 704/9 |
| 5,828,883 | * 10/1998 | Hall | 717/4 |
| 5,878,406 | * 3/1999 | Noyes | 706/55 |
| 5,950,184 | 9/1999 | Karttunen | 707/1 |
| 6,023,760 | 2/2000 | Karttunen | 712/300 |
| 6,101,492 | * 8/2000 | Jacquemin et al. | 707/3 |
| 6,163,785 | * 12/2000 | Carbonell et al. | 707/530 |
| 6,163,794 | * 12/2000 | Lange et al. | 709/202 |
| 6,167,369 | * 12/2000 | Schulze | 704/9 |
| 6,167,567 | * 12/2000 | Chiles et al. | 717/11 |

OTHER PUBLICATIONS

Title: GELEM Version 1.1 a Multilingual Lexicons Management System, Author: Losco et al, ACM, 1993.*

Title: Orthogonal Persistence and Ada, Author: Crawley et al, ACM, 1994.*

Faith,R. et al. "A Dictionary Server Protocol," The Internet Society, Oct. 1997, published on the Internet at ftp://ftp.isi.edu/in–notes/rfc2229.txt.

Cunningham, Hamish et al "Gate 2: Software Infrastructure for NLP," published on the Internet at http://www.dcs.shef.ac.uk/~hamish/gate2/proposal.html and htpp//gate.ac.uk/gate2/doc/proposal.html, Mar. 1999.

Gaizauskas, Rob et al. "Gate User Guide," published on the Internet at http://www.dcs.shef.ac.uk/research/groups/nlp/gate/system_docs/user_guide/main/main.html, Mar. 1998.

(List continued on next page.)

Primary Examiner—Mark R. Powell
Assistant Examiner—Chameli C. Das
(74) Attorney, Agent, or Firm—Oliff & Berridge, PLC

(57) ABSTRACT

An executable for a new linguistic service is produced using preexisting source code for an ancestor service that is a less specified ancestor of the new linguistic service in a hierarchy. The preexisting source code is modified, such as by further specifying it, to produce modified source code for responding to requests for the new linguistic service, where each request identifies the new linguistic service and indicates linguistic data on which it is to be performed. The modified source code is then used to produce the executable for the new linguistic service. The preexisting source code can, for example, define a top-level class in an object-oriented programming language, with common parameters including input parameters with information for obtaining the linguistic data and result parameters with information for returning results of the new linguistic service.

19 Claims, 17 Drawing Sheets

OTHER PUBLICATIONS

U. S. Patent Application No. 09/213,309 entitled "Grouping Words with Equivalent Substrings by Automatic Clustering Based on Suffix Relationships" to Eric Gaussier et al., filed December 16, 1998.

U. S. Patent Application No. 09/219,615 entitled "Automatic Language Identification using Both N–Gram and Word Information" to Bruno M. Schulze, filed Dec. 23, 1998.

U. S. Patent Application No. 09/222,549 entitled "Finding Selected Character Strings in Text" to Jean–Pierre Chanod, filed Dec. 29, 1998.

U. S. Patent Application No. 09/401,682 entitled "Using Ranked Translation Choices to Obtain Sequences Indicating Meanings of Multi–Token Expression" to Jean–Pierre Chanod et al., filed Sep. 23, 1999.

* cited by examiner

EXECUTABLE FOR REQUESTING A LINGUISTIC SERVICE

FIELD OF THE INVENTION

The invention relates to techniques for requesting linguistic services.

BACKGROUND AND SUMMARY OF THE INVENTION

A number of techniques have been proposed for providing linguistic services. For example, it has been proposed to provide software running in a dedicated server computer attached to a network, so that a linguistic service such as foreign language comprehension assistance is available on the network. Other proposed linguistic services include tokenization, tagging, morphological analysis, language identification, disambiguation, idiom recognition, contextual dictionary lookup, terminology extraction, and noun-phrase extraction, and it has been proposed to provide these services in multiple languages. It has further been proposed to use an object oriented design, such as a design written in the C++ programming language, in a portable, robust, extensible architecture both for standalone and client-server implementations.

In one proposal, a version of Xerox Linguistic Development Architecture (XeLDA), client code running on a client machine provides a request to the network for delivery to a server machine; server code running on the server machine receives the request, causes execution of appropriate software modules to perform the requested service, and produces a result, which is then provided to the network for delivery to the client machine. The server code for this version of XeLDA has an input adapter for retrieving and extracting data from the request before services are performed and an output adapter for modifying or formatting the results of the services before providing them to the network. The client code includes service stubs supporting a user application.

Faith, R. and Martin, B., *A Dictionary Server Protocol*, The Internet Society, October 1997, pp. 1–11, disclose a TCP transaction based query-response protocol that allows a client to access dictionary definitions from a set of natural language dictionary databases. The server protocol is an interface between programs and the dictionary databases. Commands and replies are composed of encoded characters, and each command consists of a command word followed by zero or more parameters. The parameters can include databases, strategies, and words. A response can be a status response indicating the server's response to the last command received or a textual response sent as a series of successive lines of textual matter. If an OPTION MIME command has been given, all textual responses are prefaced by a MIME header. Although the protocol could have been extended to specify searches over databases with certain attributes, this would needlessly complicate parsing and analysis and the classification system could restrict the types of databases that can be used. In the future, extensions to the protocol may be provided to allow a client to request binary encodings. Also, standard extensions should be proposed to allow the client to request certain content types or encodings. Given a database with sufficient mark-up information, it may be possible to generate output in a variety of different formats, the use of which may be explored as extensions to the protocol. Commands beginning with the letter "XC" are reserved for experimental extensions.

The invention addresses basic problems that arise in providing linguistic services upon request. A multitude of different services could be requested including some that are not yet available, and the data on which a service will be requested cannot be known in advance and could be in any of a large number of languages. The changing set of available services, the possibly large set of supported languages, and the unpredictability of data make it difficult to produce a linguistic services system that remains useful over an extended time.

The invention is based on the discovery of new techniques for providing linguistic services that alleviate these problems. The new techniques involve requests for a new linguistic service, which is "new" in the sense that the techniques have made it newly available. The requests each identify the new linguistic service and indicate linguistic data on which the service is to be performed. The new techniques also involve operations that respond to requests by performing the new linguistic service on linguistic data.

Each of the new techniques relates to an executable, sometimes referred to herein as a "service executable", that can be executed in response to a request and that, when executed, performs the new linguistic service. More specifically, the new techniques relate to the production of service executables from human-readable code, sometimes referred to herein as "linguistic source code" or simply "source code".

The new techniques treat linguistic services hierarchically, allowing a programmer to write source code for a new linguistic service based on a hierarchical descendant relationship with an ancestor service for which source code already exists. The ancestor service may, for example, be a less specified linguistic service or it may be a proto-service that serves only as an ancestor of one or more linguistic services within a hierarchy. Therefore, source code for the descendant can be produced by modifying the preexisting source code for the ancestor. Then, a service executable can be produced from the source code. When executed in response to a request that identifies the new linguistic service, the service executable performs the new linguistic service on the indicated linguistic data.

The new techniques alleviate the problems described above, because they make it relatively easy to add a new linguistic service by further specifying or otherwise modifying preexisting source code for an ancestor service.

Some of the new techniques can be implemented with object-oriented programming. For example, preexisting source code in an object-oriented programming language can define a class for a proto-service, referred to herein as a "top-level service class". The top-level service class can include a service identifier whose value can identify one of the descendant linguistic services, parameters that are common to the descendants, and a default execute method that can be further specified to perform any of the descendants.

Parameters of the top-level service class can include input parameters providing information needed to obtain linguistic data on which a linguistic service is performed. For example, one input parameter, referred to herein as an "input format" parameter, could indicate the format and character set of linguistic data to be processed, thus making it relatively easy to add a new input format or a new input character set. Another input parameter, referred to herein as a "data access" parameter, could include data for accessing the linguistic data, such as the linguistic data itself, a file name, a URL, or another type of access data, thus making it relatively easy to add a new way of accessing linguistic data. A related input parameter, referred to herein as a "data position" parameter, could indicate the portion of the linguistic data to be processed, such as a starting position and a number of characters Yet another input parameter, referred to herein as an "input language" parameter, could indicate the natural language of the linguistic data or could have a value indicating that the language is not known, making it relatively easy to take into account a new input language.

Similarly, parameters of the top-level service class can include result parameters providing information needed to return results of performing a linguistic service on linguistic data. For example, one result parameter, referred to herein as a "result format" parameter, could indicate the format and character set in which results are returned or could have a value indicating that the results should, be returned as an unformatted object; this would make it relatively easy to add a new results format or a new character set for results thus making it relatively easy for the client to handle results.

Starting with preexisting source code for a top-level service class or for another ancestor service class, source code can be obtained that defines a descendant class for a linguistic service, referred to herein as a "lower-level service class". The lower-level service class can include a service identifier identifying the linguistic service provided by the class, fields for parameters that are specific to the linguistic service, and methods for responding to those parameters. For example, for a lower-level service class that provides translation services or other services that respond to linguistic data in a first natural language by providing results in a second natural language different than the first, a result language parameter could indicate the natural language of results. Also, for a lower-level service class that provides dictionary lookup services on untokenized text data, a set of module type parameters could indicate types of linguistic modules that are employed, such as a type of tokenizer, a type of morpho-syntactic analyzer, a type of syntactic disambiguator, and a type of dictionary lookup.

A lower-level service class can have a specialized execute method for performing the new linguistic services by creating and calling associated methods of appropriate objects. For example, a data retrieval object can obtain linguistic data in accordance with the data access parameter. Then a content extraction object can extract textual content in accordance with the input format parameter. A language identification object can identify the language of the linguistic data in accordance with the input language parameter. One or more service module objects can perform the new linguistic service on the part of the linguistic data indicated by the data position parameter. Finally, if the result format parameters value indicates a format and character set, a result conversion object can convert the results of the new linguistic service in accordance with the format and character set indicated by the result format parameter.

A processor can accordingly respond to a request for a linguistic service by creating an instance of the lower-level service class that provides the requested service. The request can include the information necessary to create the lower-level service instance. The lower-level service instance can be transferred between machines and, when received by a server, can cause a service executable to perform the requested service in accordance with the parameters.

The data retrieval object can create a specialized instance of an input data class. The data retrieval object can use the data access parameter to create the specialized input data instance with parameters and methods appropriate for the linguistic data being accessed. To add a capability to access a new type of linguistic data, all that is necessary is to add source code to the data retrieval object so that it can create a specialized input data instance that can access the new type of linguistic data. The methods of the specialized input data instance can be implemented to retrieve linguistic data in parts, referred to herein as "chunks".

The content extraction object can create a specialized instance of an input data extraction class to extract textual content from the chunks. The content extraction object can use the input format parameter to create the specialized input data extraction instance with fields and methods appropriate for the chunks being retrieved. To add a capability to access linguistic data in a new format, all that is necessary is to add source code to the content extraction object so that it can create a specialized input data extraction instance that can extract textual content from chunks of linguistic data in the new format.

The new techniques can also treat result conversion objects hierarchically, allowing a programmer to write source code for a format definition class for a new format and character set based on a hierarchical descendant relationship with an ancestor conversion class for which source code already exists. The ancestor conversion class may, for example, be a less specified class or it may be a proto-class that serves only as an ancestor of one or more conversion classes within a hierarchy. Therefore, source code for the descendant can be produced by modifying the preexisting source code for the ancestor. Then, a conversion executable can be produced from the source code. When executed in response to a request that indicates the new conversion method, the conversion executable creates an instance of the new format definition class that converts results of a linguistic service accordingly.

The result conversion object produced by the execute method of the new linguistic service can be a specialized instance of a pivot format class, which provides a representation of a document. The pivot format object can have an export method that uses a format definition object to convert the specialized pivot format instance into an object containing the result converted to the format and character set indicated by the result format parameter.

To add a capability to convert results to a new format, all that is necessary is to add source code to an ancestor format definition object to obtain a specialized format definition object class that can convert to the new format.

The new techniques can also treat communication methods hierarchically, allowing a programmer to write source code for a new communication method based on a hierarchical descendant relationship with an ancestor communication class for which source code already exists. The ancestor communication class may, for example, be a less specified class or it may be a proto-class that serves only as an ancestor of one or more communication classes within a hierarchy. Therefore, source code for the descendant can be produced by modifying the preexisting source code for the ancestor. Then, a communication executable can be produced from the source code. When executed in response to a request that indicates the new communication method, the communication executable communicates accordingly.

Two proto-classes can be ancestors of other communication methods, a top-level client-side class for execution by a processor at a client machine and a top-level server-side class for execution by a processor at a server. In addition to allowing implementation of most client-server communication protocols, the new techniques can therefore be implemented in a standalone application by modifying the top-level client-side class to obtain a lower-level client-side class for directly providing a lower-level service instance as an input to the client processor while executing a service executable. A counterpart instance of the top-level client-side class is not necessary. The lower-level client-side instance can thus provide a direct link to an executable that would otherwise be executed at the server, thus avoiding the need for transport of requests and results over a network.

The new techniques are advantageous because they allow abstract definition of linguistic services. In addition, a new service can be added quickly and easily by providing new source code that is a modified version of preexisting source code for an ancestor service.

The following description, the drawings, and the claims further set forth these and other aspects, objects, features, and advantages of the invention.

DETAILED DESCRIPTION OF THE INVENTION

A. Conceptual Framework

Figure 1:
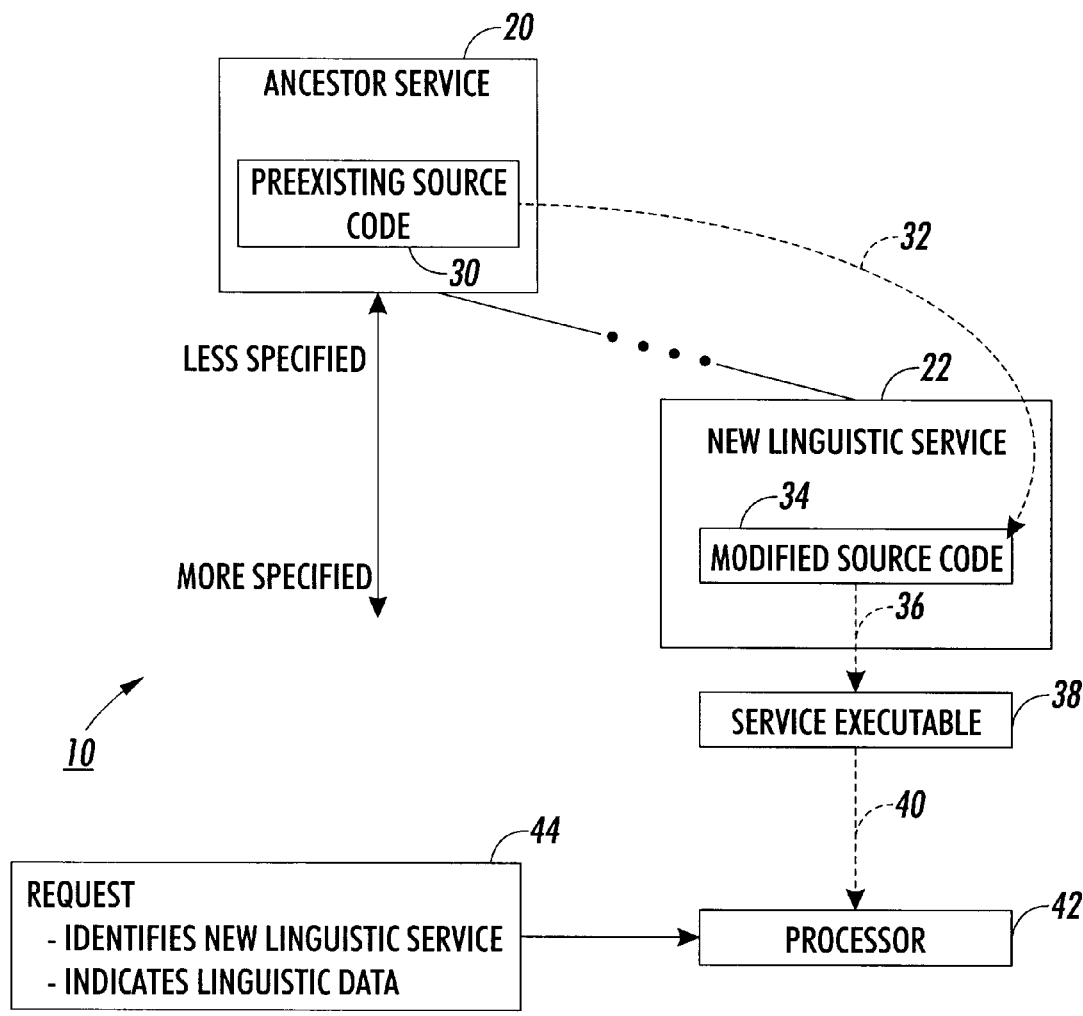
FIG. 1 is a schematic diagram showing how a service executable can be produced for responding to a request for a new linguistic service.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values". For example, a binary item of data, also referred to as a "bit", has one of two values, interchangeably referred to as "1" and "0" or "ON" and "OFF" or "high" and "low".

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMS. As used herein, "storage medium" covers one or more distinct units of a medium that together store a body of data. For example, a set of diskettes storing a single body of data would together be a storage medium.

A "storage medium access device" is a device that includes circuitry that can access data on a data storage medium. Examples include drives for accessing magnetic and optical data storage media.

"Memory circuitry" or "memory" is any circuitry that can store data, and may include local and remote memory and input/output devices. Examples include semiconductor ROMs, RAMS, and storage medium access devices with data storage media that they can access.

A "processor" is a component of circuitry that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations. A processor may include one or more central processing units or other processing components.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between machines.

A processor "accesses" an item of data in memory by any operation that retrieves or modifies the item or information within the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item.

A processor accesses a first item of data "with" a second item of data if the processor uses the second item of data in accessing the first, such as by using the second item to obtain a location of the first item of data or to obtain information from within the first item of data.

To "obtain" or "produce" an item of data is to perform any combination of operations that begins without the item of data and that results in the item of data. An operation "retrieves" an item of data if the operation obtains the item of data by accessing a memory in which the item of data is stored.

An item of data "indicates" a thing, event, or characteristic when the item has a value that depends on the existence or occurrence of the thing, event, or characteristic can be obtained by operating on the item of data. An item of data "indicates" another value when the item's value is equal to or depends on the other value.

An item of data "includes" information indicating a thing, event, or characteristic if data indicating the thing, event, or characteristic can be obtained by operating on the item of data.

An item of data "identifies" or "is an identifier of" one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data; or the second item of data can be obtained by decoding the first item of data; or the first item of data can be an identifier of the second item of data; and so forth.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

A "natural language" is an identified system of symbols used for human expression and communication within a community, such as a country, region, or locality or an ethnic or occupational group, during a period of time. Some natural languages have a standard system that is considered correct, but the term "natural language" as used herein could apply to a dialect, vernacular, jargon, cant, argot, or patois, if identified as distinct due to differences such as pronunciation, grammar, or vocabulary. The natural languages include ancient languages such as Latin, ancient Greek, ancient Hebrew, and so forth, and also include synthetic languages such as Esperanto and Unified Natural Language (UNL).

An "instruction" is an item of data that a processor can use to determine its own operation. A processor "executes" a set of instructions when it uses the instructions to determine its operations.

An "executable" is an item of data that defines a set of instructions in a form in which a processor can execute them. An executable need not be independently executed, but could be executed when called by another executable.

A "program" is an item of data that indicates a sequence of instructions that a processor can execute. A "programming language" is a set or group of related systems of symbols used for writing instructions in human-readable form. "Source code" refers to any combination of instructions written in a programming language, whether or not sufficient to be a program. The source code of a program can be used to produce an executable for the program, such as by compiling or interpreting the source code.

To "modify" source code is to change it by making modifications within it. For example, a programmer can modify source code by interactively editing it, such as by deleting parts of the source code and inserting new parts into the source code. A programmer can use automatic or semi-automatic techniques to modify source code, such as a macro-editor, a program generator, a graphical interface generator, and so forth.

An "object-oriented programming language" is any programming language that supports the object-oriented paradigm. Well known examples include SmallTalk and C++.

When used in relation to an object-oriented programming language, the terms "parameter" and "method" have the following related meanings herein: Source code of an object-oriented programming language may define a class in terms of its "methods" and "parameters", where a method is an operation applicable to instances of the class and a parameter, sometimes called an "instance variable", is an item of data that is owned by an instance of the class. For example, in some implementations of the C++ programming language, a class can have parameters called "data members" that can take values and methods that can indicate operations to be performed using the values of the data members, and each method can have a list of parameters, potentially empty, that are specified when calling the method; a C++ class can therefore be modified by modifying its parameters and data members.

An "object" is an instance of a class, and is sometimes referred to herein as a "specialized instance". An object has the parameters and methods of its class. It is common to think of methods as being sent to objects as messages.

A "hierarchy within which an ancestor is less specified than its descendants" is a hierarchy with at least two levels such that a descendant of an ancestor can be obtained from the ancestor by further specifying the ancestor. A hierarchy of classes in an object-oriented programming language is an example of such a hierarchy: A descendant class, or "subclass", inherits the parameters and methods of its ancestor, or "superclass"; in addition, a subclass may have additional methods or parameters and may also have a definition of a class method, referred to herein as a "specialized method", that overrides the definition of the method in its superclass. A class at the top level of such a hierarchy is a "top-level class", while a class at a lower level is a "lower-level class".

A parameter is "specific" to a lower-level class if the parameter is not a parameter of the class that is the parent of the lower-level class.

A "linguistic service" is a service that relates to one or more natural languages. Therefore, the broad scope of linguistic services encompasses any language-related operation that a user might request. Examples include tokenization, morphological analysis, part-of-speech tagging or disambiguation, low-level pattern extraction, stemming and lemmatizing, language identification, optical character recognition (OCR), speech recognition, dictionary and lexicon lookup, translation assistance, text extraction, summarization, annotation and glossing, information retrieval, shallow parsing, comprehension assistance, language-related knowledge management, indexation, idiom recognition noun phrase extraction, verb phrase extraction, and various combinations of these services.

Linguistic services may be contrasted with the basic functions performed by "linguistic modules", each of which is a collection of one or more executables that can be called to provide a basic function. Each linguistic service can thus be provided by calls to one or more linguistic modules, and a linguistic module might, in turn, call other linguistic modules.

The term "linguistic data" refers herein to any type of data on which a linguistic service could be performed. The most common form of linguistic data is encoded text in which each character is represented by a code from a standard code set, such as ASCII or Unicode. Other forms of linguistic data include text image data defining an image of text, recorded speech data, encoded speech in which each phoneme is represented by a code, and so forth.

The broad scope of linguistic data includes any output data from circuitry that receives a form of human language as input and provides related data as output.

An operation "extracts" an item of linguistic data if the operation obtains the item of linguistic data from a body of data that also includes other information. The body of data could, for example, define a document that could be printed or presented by a multi-media computer. An operation extracts "textual content" it the operation extracts an item of linguistic data indicating a sequence of words or other semantic units of a natural language but not information about structure, format, and other additional information.

An item of linguistic data has a "format" if the item includes information indicating how its textual content should be presented. An "unformatted object" is an object that includes an item of linguistic data that has only textual content.

An item of linguistic data has a "character set" if its textual content includes a sequence of characters that are tokens from a set of character types.

In a given implementation in which items of linguistic data are handled in parts, a "chunk" of an item of linguistic data is a part of the item whose size is no greater than a maximum size that can be handled by the implementation.

A linguistic service or other function or component is "new" if it is newly available in a system.

B. General Features

Figure 2:
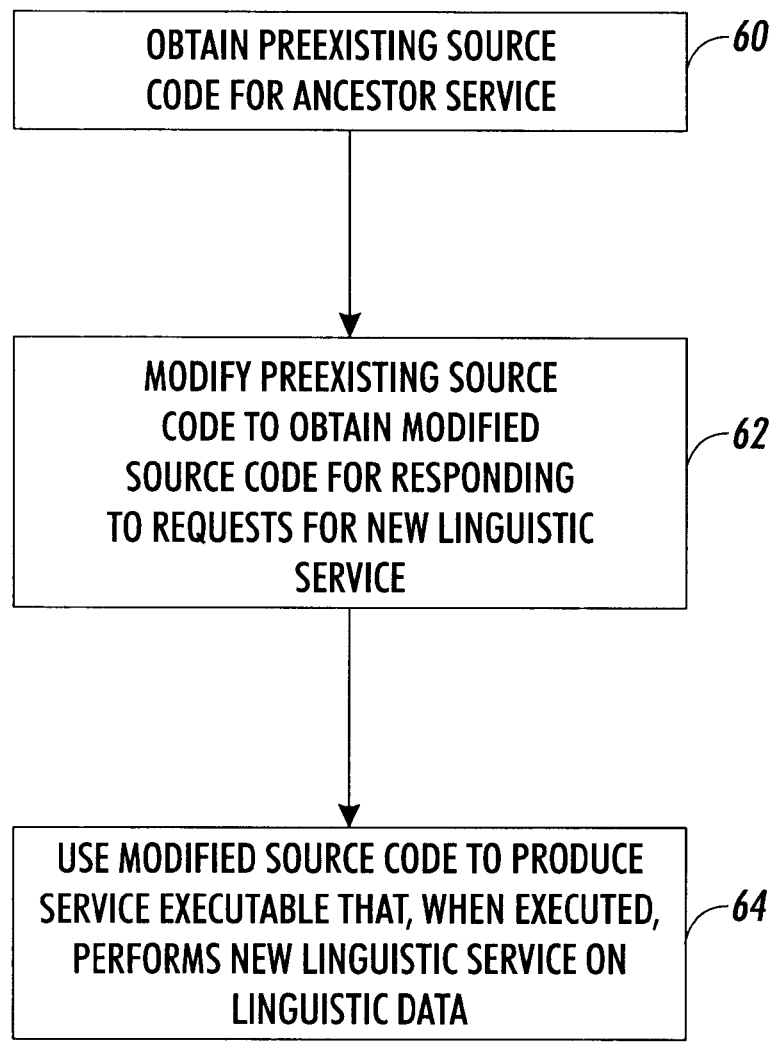
FIG. 2 is a flow chart showing general acts in producing a service executable for performing a new linguistic service.
Figure 3:
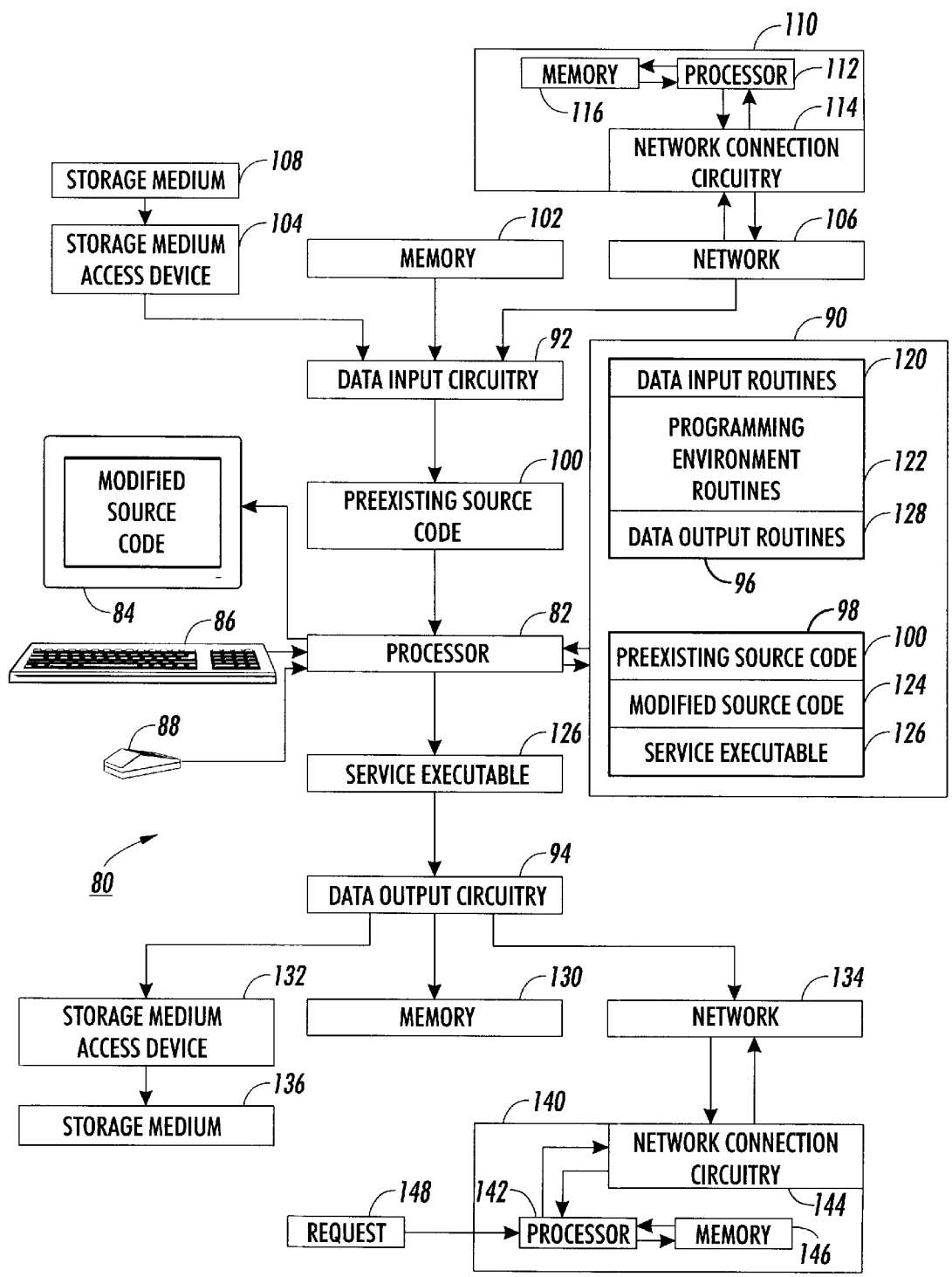
FIG. 3 is a schematic diagram showing components of a system that can perform the general acts in FIG. 2.

FIGS. 1–3 illustrate general features of the invention.

FIG. 1 illustrates a hierarchy 10 of services. Ancestor service 20 is the root of hierarchy 10, and is less specified than any of its descendants. Its descendants are exemplified by new linguistic service 22, which can be at any level of hierarchy 10 below ancestor service 20, as suggested by the dotted line connection to ancestor service 20.

Preexisting source code 30 for ancestor service 20 has been modified, as indicated by dashed line 32, to produce modified source code 34 for responding to requests for new linguistic service 22. As indicated by dashed line 36, modified source code 34 has in turn been used to produce service executable 38 for new linguistic service 22.

As indicated by dashed line 40, service executable 38 can be executed by processor 42 in response to request 44. Request 44 identifies new linguistic service 22 and indicates linguistic data on which to perform new linguistic service 22. When executed by processor 42 in response to request 44, service executable 38 performs new linguistic service 22 on the indicated linguistic data.

In box 60 in FIG. 2, preexisting source code for an ancestor service is obtained. Then, in box 62, a human modifies the preexisting source code to obtain modified source code for responding to requests for a new linguistic service. Each request identifies the new linguistic service and indicates linguistic data on which to perform it.

In box 64, the modified source code from box 62 is used to produce a service executable. When executed by a processor in response to a request for the new linguistic service, the service executable performs the new linguistic service on the linguistic data indicated by the request.

Machine 80 in FIG. 3 includes processor 82 connected for providing signals to one or more user output devices such as display 84 and connected for receiving signals from one or more user input devices such as keyboard 86 and mouse 88. Processor 82 is also connected for accessing data in memory 90, for receiving data through data input circuitry 92, and for providing data through data output circuitry 94. Memory 90 illustratively includes program memory 96 and data memory 98.

Data input circuitry 92 can illustratively provide preexisting source code 100 received from connections to memory 102, storage medium access device 104, or network 106.

Memory 102 could be any conventional memory within machine 80, including random access memory (RAM) or read-only memory (ROM), or could be a peripheral or remote memory device of any Wind.

Storage medium access device 104 could be a drive or other appropriate device or circuitry for accessing storage medium 108. Storage medium 108 could, for example, be a magnetic medium such as a set of one or more tapes, diskettes, or floppy disks; an optical medium such as a set of one or more CD-ROMs; or any other appropriate medium for storing data. Storage medium 108 could be a part of machine 80, a part of a server or other peripheral or remote memory device, or a software product. In each of these cases, storage medium 108 is an article of manufacture that can be used in a machine.

Network 106 can provide preexisting source code 100 from machine 110. Processor 112 in machine 110 can establish a connection with processor 82 over network 104 through network connection circuitry 114 and data input circuitry 92. Either processor could initiate the connection, and the connection could be established by any appropriate protocol. Then processor 112 can access preexisting source code 100 stored in memory 116 and transfer preexisting source code 100 to processor 82 over network 104.

Processor 82, in executing data input routines 120 in program memory 96, loads preexisting source code 100 received from data input circuitry 92 into data memory 98.

In executing programming environment routines 122, processor 82 provides a user interface through which a human can interactively modify preexisting source code 100 to obtain modified source code 124 for responding to requests for a new linguistic service. The user interface can present images of excerpts from and other information about preexisting source code 100, modified source code 124, and intermediate versions on display 84. The user interface can also perform operations requested by user signals provided through keyboard 86 and mouse 88. The operations requested by user signals can include editing operations that modify preexisting source code 100 or intermediate versions to obtain modified source code 124 and also compile or interpret operations that use modified source code 124 to obtain service executable 126.

When service executable 126 has been obtained, processor 82 can execute data output routines 128 to provide service executable 126 to an appropriate destination through data output circuitry 94.

FIG. 3 illustrates three possible destinations to which data output circuitry 94 could provide service executable 126--memory 130, storage medium access device 132, and network 134. In each case, service executable 126 could be provided separately or as part of a group of executables similarly produced.

Memory 130 could be any conventional memory within machine 80, including random access memory (RAM) or read-only memory (ROM), or could be a peripheral or remote memory device of any kind.

Storage medium access device 132 could be a drive or other appropriate device or circuitry for accessing storage medium 136, which could, for example, be a magnetic medium such as a set of one or more tapes, diskettes, or floppy disks; an optical medium such as a set of one or more CD-ROMs; or any other appropriate medium for storing data. Storage medium 136 could be a part of machine 80, a part of a server or other peripheral or remote memory device, or a software product. In each of these cases, storage medium 136 is an article of manufacture that can be used in a machine.

Network 134 can provide service executable 126 to machine 140. Processor 82 in machine 80 can establish a connection with processor 142 in machine 140 over network 134 through data output circuitry 94 and network connection circuitry 144. Either processor could initiate the connection, and the connection could be established by any appropriate protocol. Then processor 82 can access service executable 126 stored in data memory 98 and transfer service executable 126 to processor 142 over network 134. Processor 142 can store service executable 126 in memory 146 or elsewhere.

Processor 142 is also connected for receiving request 148, identifying the new linguistic service and indicating linguistic data on which to perform it. Processor 142 could obtain request 148 from any appropriate source, including user input circuitry (not shown), memory 146, network 134, or other data input circuitry (not shown). In response to request 148, processor 142 can access service executable 126 in memory 146 or elsewhere and execute it to perform the new linguistic service on the indicated linguistic data.

C. Implementation

The general features described above could be implemented in numerous ways on various machines to obtain executables for responding to requests for new linguistic services. An implementation described below has been implemented on personal computers and workstations running Unix and Windows and producing executables compiled from C++ source code, and could be run on any machine with a C++ compiler, even if provided with a VME card or a specialized chip.

C.1. Architecture

The current implementation provides a programming environment for development and production of further versions of Xerox Linguistic Development Architecture or "XeLDA" (also known as Xerox Engine for Linguistic Dependent Applications). XeLDA provides an architecture and execution platform that supports the development both of linguistic applications and of new linguistic services to be used by existing applications, possibly including applications developed by third parties.

The generic development framework of XeLDA can therefore be used to develop document content processing applications that are linguistics-based or linguistics-enriched. It provides application developers and researchers with a common development architecture for open and seamless integration of linguistic services. For example, a suite of multilingual tools and terminology management tools have been developed using XeLDA. Types of linguistic services provided through the current implementation of XeLDA include language identification, tokenization, morphologic analysis, noun phrase extraction, shallow parsing, glossing, and others.

A developer of a linguistic application or other document content processing software must take into account a number of problems: For a suite of multilingual tools or other application needing extensive linguistic resource due to support for a number of languages or due to size of dictionaries, the software is CPU and memory intensive. Development of such an application requires a specific software interface with components outside the application, even though the interface must be designed to be easily adapted to changes in the application's environment without loss of performance of the application. Many of the linguistic algorithms employed by the application are evolving rapidly, and it must be possible to replace an algorithm with a new or updated algorithm without adversely affecting the application. To support lightweight applications that make only marginal use of linguistic components, it is necessary to have a simple to program Application Programming Interface (API) and a small memory footprint.

XeLDA addresses these problems by dividing an application into basic components using an object oriented approach. Each basic component has a comprehensive abstract interface. The interfaces have been designed to be easily specialized to meet the needs of linguistic algorithms.

XeLDA's architecture can thus be characterized as follows: It specifies a definition of a linguistic process to be performed on data. It clearly separates this definition from its execution, allowing remote execution and therefore also allowing CPU and memory intensive algorithms. It divides the steps necessary to perform a high quality linguistic service into basic pieces, each with an abstract interface; as a result, each piece can be easily derived and specialized for a particular application or can be replaced by a new or more powerful algorithm, and each piece is reusable by other systems that perform document content processing. It splits high level linguistic services into basic linguistic modules, so that a module can be added or updated to enhance the quality of several linguistic services that include it. It provides an automatic formatting service to return results either in a raw form usable by most existing applications or in a formatted form that can be directly presented to the user.

The XeLDA architecture can be used to provide these features for almost no additional cost and with the certainty they will be always up to date. Any user can refine any feature according to the environment or application domain in which the user is working. A developer of linguistic services will find XeLDA to be an open architecture that can be used to integrate linguistic technologies and associated linguistic resources, allowing quick and easy addition of linguistic and non-linguistic components. A user of linguistic services will find XeLDA to provide an easy to use and unified interface to linguistic services, also allowing quick and easy addition of linguistic services to other applications.

Figure 4:
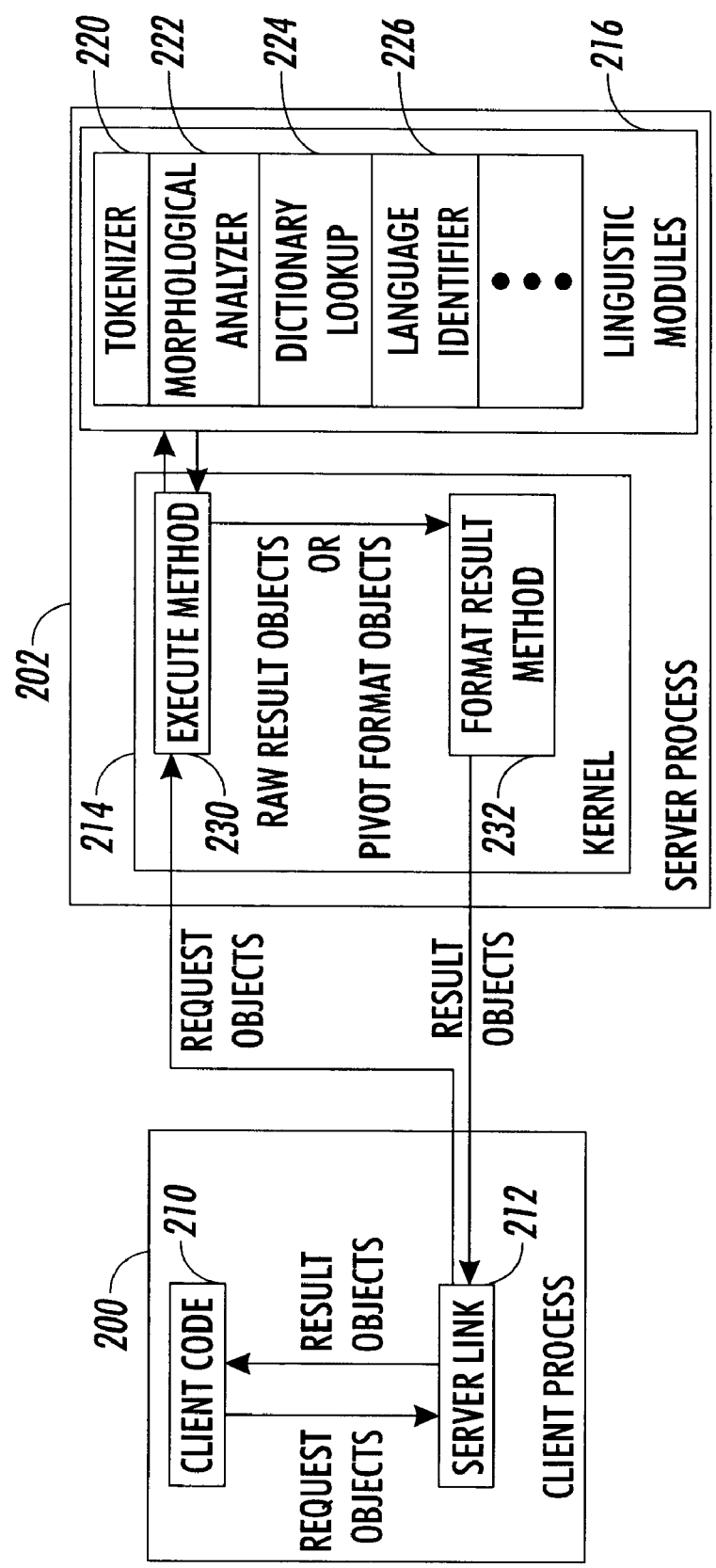
FIG. 4 is a schematic diagram showing an architecture for an environment in which the general acts in FIG. 2 have been implemented.

FIG. 4 shows features of the XeLDA architecture. As shown, the architecture employs two major processes, client process 200 and server process 202.

Client process 200 includes client code 210 and server link 212. Client code 210 can be executable code for any appropriate linguistic dependent application, and can be developed in any appropriate programming environment. Server link 212, on the other hand, is a XeLDA executable that provides an interface between client code 210 and server process 202. As shown, client code 210 provides request objects to server link 212, which in turn provides them to server process 202. Server process 202 provides result objects to server link 212, which in turn provides them to client code 210.

Server process 202 includes kernel 214 and linguistic modules 216. Linguistic modules 216 need not themselves be XeLDA executables, but rather can be linguistic executables developed in any appropriate programming environment and capable of providing basic operations that can be called in providing linguistic services. Linguistic modules 216 illustratively include tokenizer 220, morphological analyzer 222, dictionary lookup 224, and language identifier 226. The modules themselves may include or have access to linguistic resources such as various kinds of databases, dictionaries, thesauri, etc., and can load such resources in order to access them, possibly with help from other objects (not shown).

Kernel 214 typically responds to a request object from server link 212 with two methods. First, execute method 230 is performed in response to the request object, providing as its output either a raw result object or a pivot format object. Then, format result method 232 is performed, converting the raw result object or pivot format object from execute method 230 into the result object that is provided to server link 212. Execute method 230 is a method that provides the linguistic service identified by the request object received from server link 212, and in turn can call one or more of linguistic modules 216. Result format method 232 is a method that provides a result format in accordance with a parameter in the request object.

C.2. Programming Environment

Figure 5:
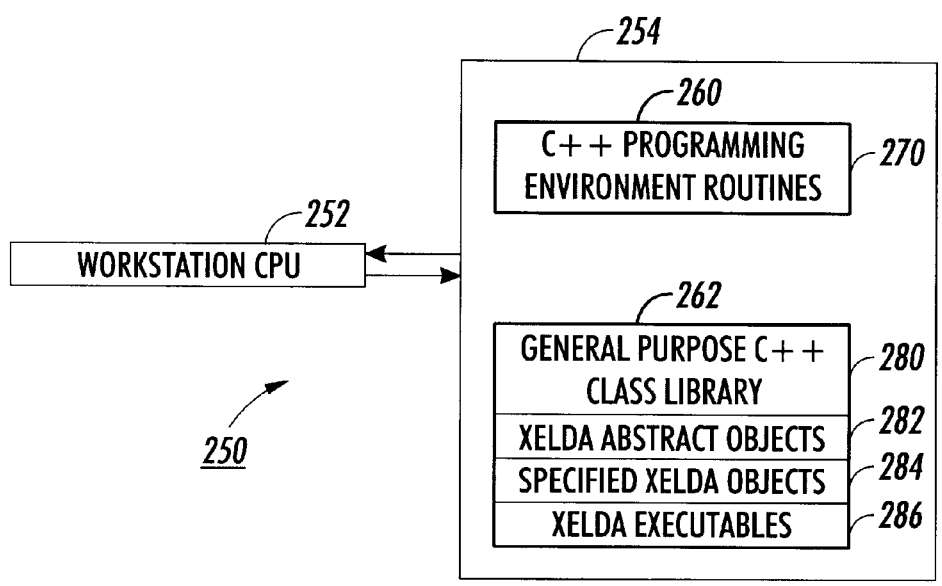
FIG. 5 is a schematic diagram of a system in which some of the components in FIG. 3 have been implemented.

FIG. 5 shows how certain components in FIG. 3 can be implemented to provide a XeLDA programming environment.

In system 250, workstation central processing unit (CPU) 252 can be connected to other components as processor 82 is in FIG. 3, including memory 254. Program memory 260 and data memory 262 can include data as program memory 96 and data memory 98 do in FIG. 3. Specifically, program memory 260 stores C++ programming environment routines 270, such as EMACS with the GNU C++ Compiler, Microsoft Visual C++, or Sun Workshop C++ software. Data memory 262 stores general purpose C++ class library 280 such as Tools.h++ available from Rogue Wave Software, Inc. or a similar library from 18 another vendor such as Rational Software Corp. or ObjectSpace, and also stores XeLDA abstract objects 282, specified XeLDA objects 284, and XeLDA executables 286.

In implementing the general acts in FIG. 2, CPU 252 can load XeLDA abstract objects 282, which are examples of preexisting C++ source code, in any of the ways described above in relation to preexisting source code 100 in FIG. 3. Then, CPU 252 can execute routines 270 to provide an interactive programming environment like that described above in relation to FIG. 3, enabling a programmer to modify the C++ source code for XeLDA abstract objects 282 to obtain specified XeLDA objects 284, which are examples of modified source code 124. CPU 252 can further execute routines 270 to compile specified XeLDA objects 284, producing XeLDA executables 286, which include examples of service executable 126. Then, CPU 252 can provide XeLDA executables 286 in any of the ways described above in relation to service executable 126 in FIG. 3.

C.3. Communication Objects

Figure 6:
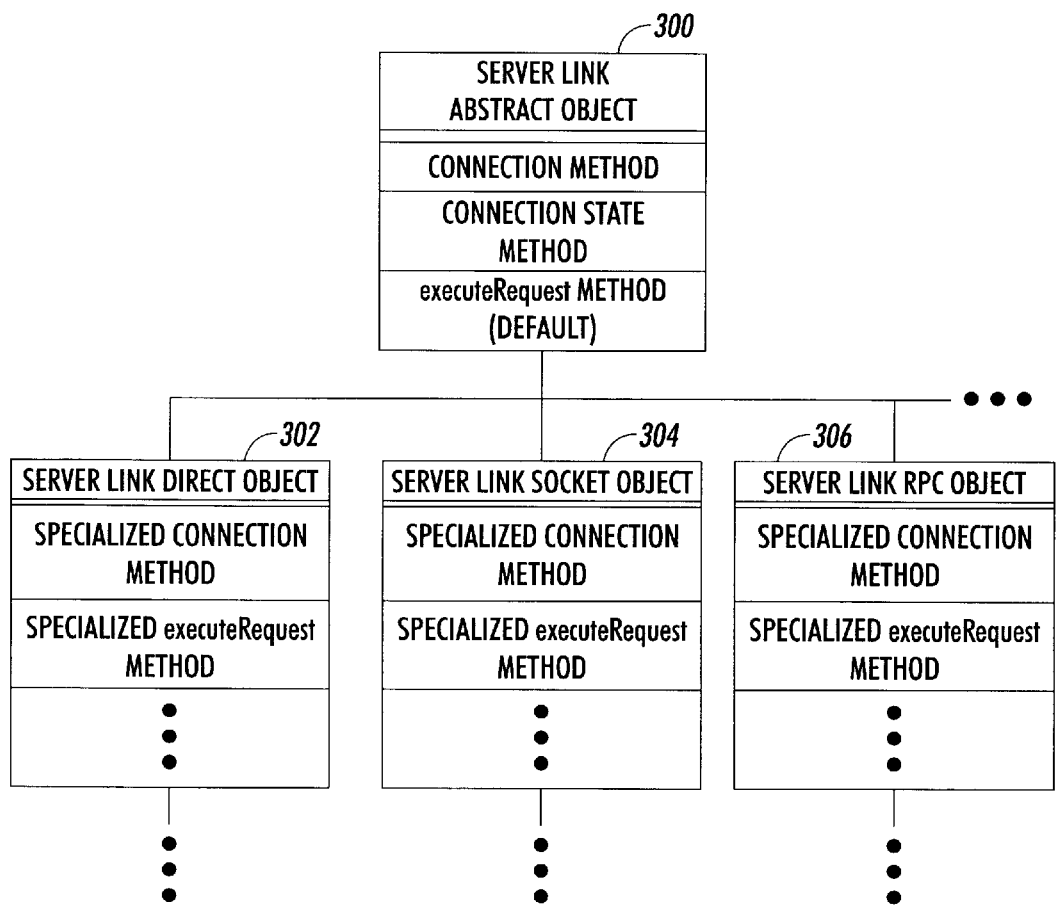
FIG. 6 is a schematic diagram of a hierarchy of server link objects for implementing the server link in FIG. 4.
Figure 7:
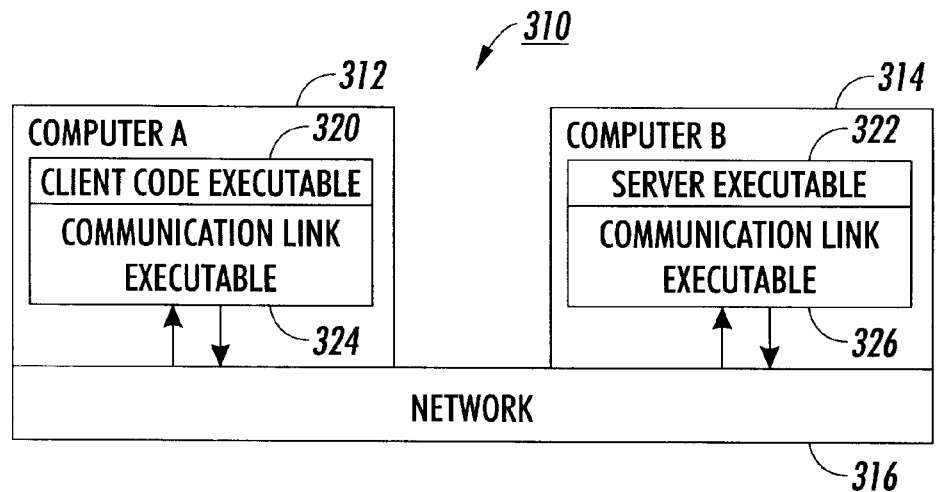
FIG. 7 is a schematic diagram showing how a communication link can be implemented between two computers.
Figure 8:
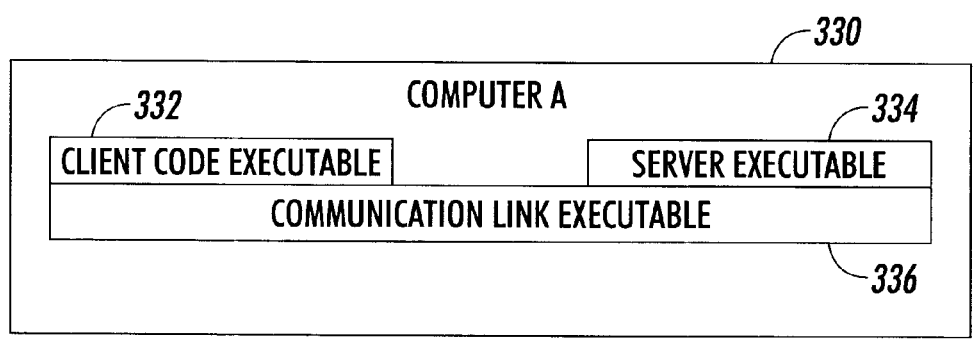
FIG. 8 is a schematic diagram showing how a communication link can be implemented within a standalone application.
Figure 9:
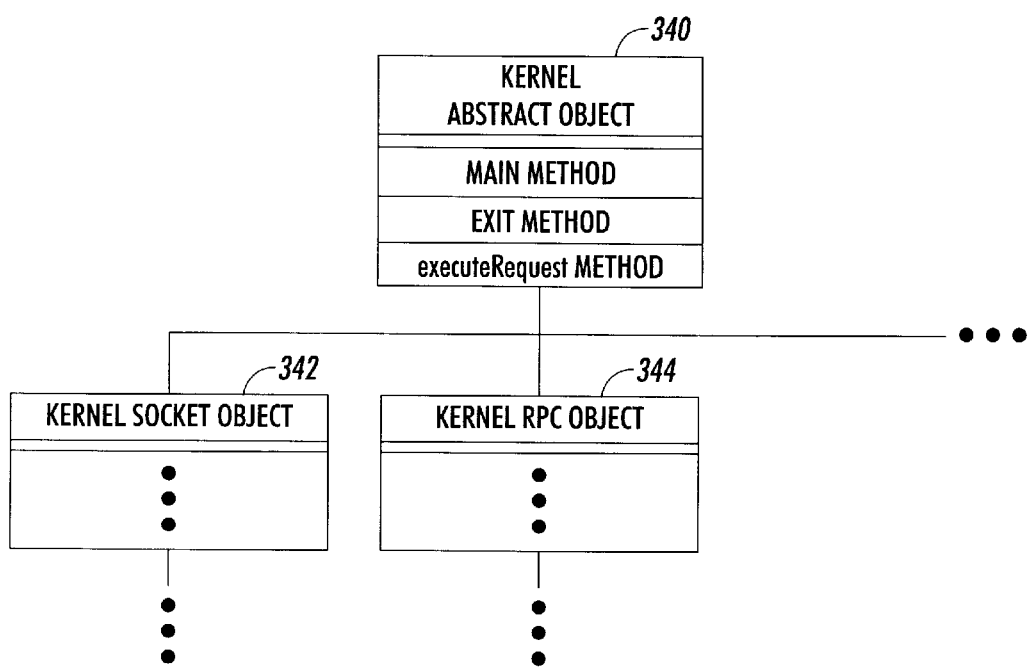
FIG. 9 is a schematic diagram of a hierarchy of kernel objects for implementing the kernel in FIG. 4.

FIG. 6 illustrates XeLDA objects that can implement server link 212 in FIG. 4. FIGS. 7 and 8 illustrate two ways in which a communication link can be provided by execute Request methods as shown in FIG. 6. FIG. 9 illustrates XeLDA objects that can implement a counterpart communication function for kernel 214 in FIG. 4.

In FIG. 6, server link abstract object 300 is a top-level client-side communication class that serves as an ancestor for lower-level communication classes that communicate request objects from client process 200 to server process 202 for execution and that receive result objects that are returned. As shown, abstract object 300 can have a connection method, a connection state method, and an executeRequest method, which is a default method that must be further specified for descendants of abstract object 300.

The connection method can be called with a string identifying a server machine and with a password string, and can return a value indicating whether a connection has been established. The connection state method can be called to obtain a boolean value indicating whether a connection is currently established or not.

The executeRequest method can be called with a request object, which client code 210 can produce by executing a standard C++ statement. The executeRequest method can be specialized to produce an equivalent request object for transfer to execute method 230 and can return a result object produced by format result method 232. A specialized version of this method for a descendant of abstract object 300 therefore allows request objects to be sent from a processor executing client code 210 to a processor (perhaps the same processor) executing kernel 214 and also allows result objects to be sent back.

Server link abstract object 300 can be modified to further specify methods and parameters, and can thus be used to implement most types of client-server protocols. FIG. 6 illustrates three examples, but many other examples could be implemented.

Server link direct object 302 is a descendant of server link abstract object 300, but with the connection method and the executeRequest method further specified to invoke appropriate server-side operations on the same processor rather than on a different server machine. For example, the executeRequest method can be implemented to directly call an appropriate server-side version of execute method 230 and return results. Server link direct object 302 therefore makes it possible to transparently provide linguistic services either in server process 202 on a remote machine or in a version of server process 202 running in the same application as client process 200.

Server link socket object 304 and server link remote procedure call (RPC) object 306, on the other hand, are descendants of server link abstract object 300, but with connection methods and executeRequest methods further specified to invoke appropriate server-side operations on a remote processor through a network. Socket object 304 can communicate with conventional socket techniques, while RPC object 306 can communicate with conventional RPC techniques. As suggested in FIG. 6, many other descendants of server link abstract object 30 could be implemented by further specifying methods and parameters, and the instances shown in FIG. 6 could also be further specified to produce lower level descendant objects. For example, various other communication protocols or techniques could be implemented, including. UnixPipes or other links implemented through a file system; http or other network protocols; and any of various electronic mail communication techniques.

FIGS. 7 and 8 illustrate important differences between the executeRequest methods of socket object 304 and RPC object 306, on the one hand, and of direct object 302 on the other.

In FIG. 7, system 310 includes computer A 312 and computer B 314, each connected to network 316, which can be any network through computers can communicate with each other. Computer A 312 is illustratively running client code executable 320, while server executable 322 is illustratively loaded on computer B 314.

During execution, client code executable 320 provides a request for linguistic services to communication link executable 324, which in turn establishes communication with computer B 314 through network 316, using an appropriate communication technique or protocol. In response, computer B 314 executes communication link executable 326. Communication link executable 324 provides signals defining a request object to communication link executable 326, such as by serializing the request object, and can then wait for results. Communication link executable 326 receives the signals and recreates the request object, such as by deserializing. Then, communication link executable 326 makes appropriate calls to server executable 322 so that the requested linguistic service is performed, receives a result object from server executable 322, and provides signals defining the result object to communication link executable 324, such as by serializing. Communication link executable 324 receives the signals and recreates the result object, such as by deserializing, and provides it to client code executable 320.

In FIG. 8, in contrast, computer A 330 has both client code executable 332, which can be the same as client code executable 320 in FIG. 7, and server executable 334, which can be the same as server executable 322. Therefore, when client code executable 332 provides a request for linguistic services to communication link executable 336, there is no need to establish communication with another computer. Instead, communication link executable 336 can directly make appropriate calls to server executable 334 so that the requested linguistic service is performed, receive a result object from server executable 334, and provide the result object to client code executable 332.

Communication link executable 324 in FIG. 7 thus illustrates how socket object 304 and RPC object 306 in FIG. 6 would respond to requests from client code, while communication link executable 336 illustrates in FIG. 8 illustrates how direct object 302 would respond.

In FIG. 9, kernel abstract object 320 is a top-level server-side communication class that serves as an ancestor for lower-level communication classes. AS shown, it can have a main method, an exit method, and an executeRequest method. The main method and the exit method are abstract in kernel abstract object 320, and must therefore be specialized in descendant objects.

The main method can be invoked by the application on the server machine. The method will exit after the call of the exit method when, for example, the user closes the server application. The main method can receive signals defining a request object from the executeRequest method of one of the instances of server link abstract object 300 and, in response, can recreate the request object using routines from general purpose class library 280, such as by deserializing.

The excuteRequest method can be called by the main method with a request object received in the manner described above and can return a result object produced by format result method 232. The executeRequest method therefore makes appropriate calls to execute method 230 for performance of a requested linguistic service.

Kernel abstract object 320 can be modified to further specify methods and parameters, and can thus be used to implement server-side counterparts of lower-level client-side communication classes. FIG. 9 illustrates two examples—kernel socket object 322, a counterpart of server link socket object 304, and kernel RPC object 324, a counterpart of server link RPC object 306—but many other examples could be implemented. As suggested in FIG. 9, many other descendant of kernel abstract object 320 could be implemented by further specifying methods and parameters, and the descendants shown in FIG. 9 could also be further specified to produce lower level descendant objects, as described above in relation to FIG. 6.

Note that a counterpart of server link direct object 302 is not necessary because there is no need to recreate a request object where execution of the request occurs in the same application as the client code without a server, as illustrated in FIG. 8.

C.4. Request Objects

Figure 10:
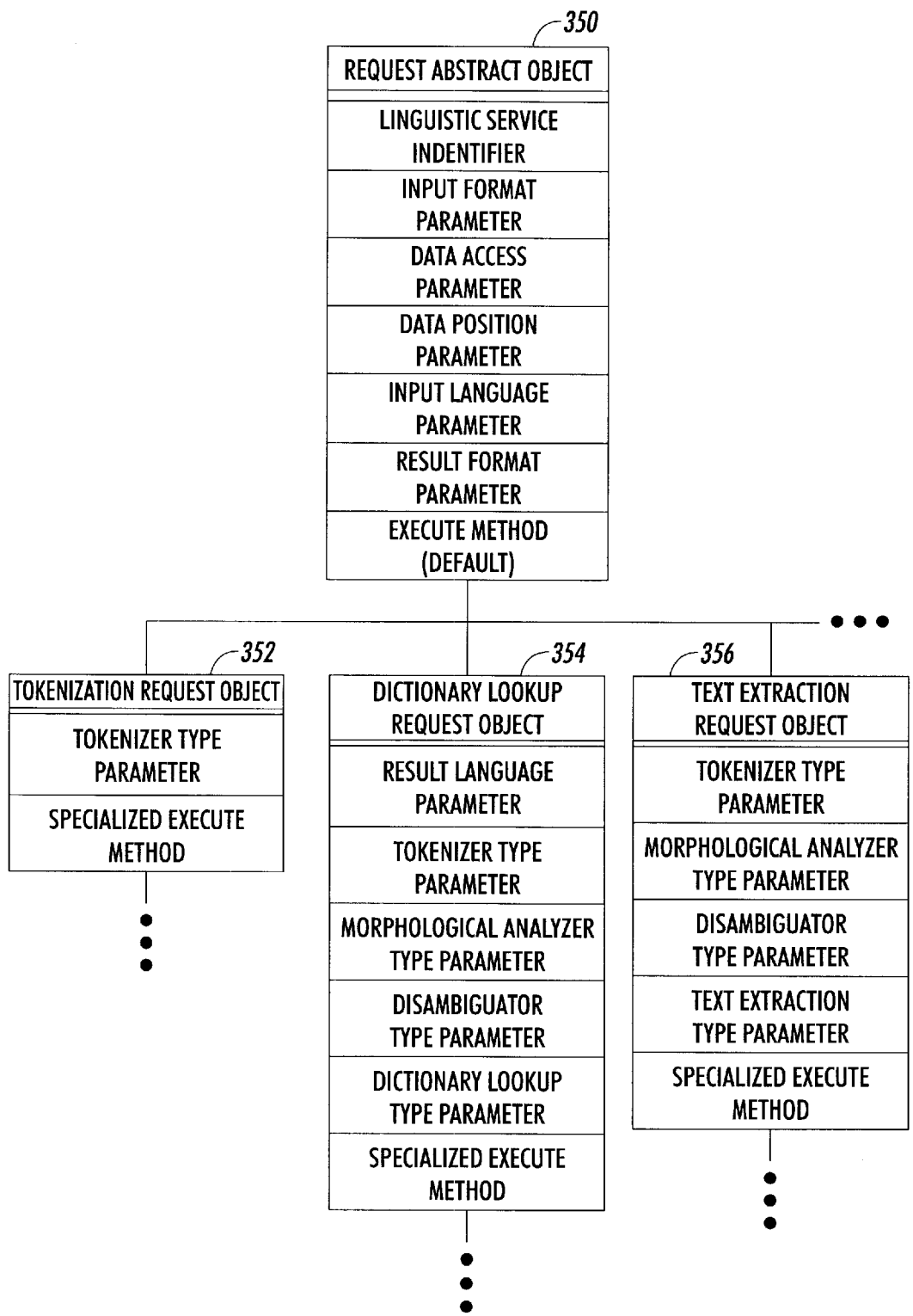
FIG. 10 is a schematic diagram of a hierarchy of request objects for implementing request objects in FIG. 4.

FIG. 10 illustrates XeLDA objects that can implement request objects in FIG. 4.

In FIG. 10, request abstract object 350 is a top-level service class that serves as an ancestor for lower-level service classes that define linguistic services. As such, it provides an abstract definition of linguistic services and allows quick and easy addition of a new linguistic service by specifying it to obtain a lower-level service class that can define the new service. Each instance of a lower-level service class contains parameters whose values define a linguistic service in sufficient detail to permit performance of the service. The parameters can indicate, for example, a type of linguistic service that is requested; format, location, language, and portion of linguistic data on which to perform the requested service; format and language of results of the requested service; and the types and parameters of underlying linguistic modules to use.

Abstract object 350, however, need only include parameters that are common to all its descendants and the descendant services they define,, together with a default execute method that must be specialized for each type of descendant of abstract object 350. As shown, abstract object 350 can have a linguistic service identifier, an input format parameter, a data access parameter, a data position parameter, an input language parameter, and a result format parameter, in addition to the default execute method.

The linguistic service identifier is a parameter whose value identifies the linguistic service requested by a request object.

The input format parameter, data access parameter, data position parameter, and input language parameter are all input parameters for providing information that can be used to obtain linguistic data on which a linguistic service is performed. The input format parameter can indicate a format and character set of the linguistic data, such as Iso Latin1 plain text, UTF8 HTML, RTF, etc. The data access parameter can include data for accessing the linguistic data, and can, for example, be the linguistic data itself, a name of a file that contains the data, or a URL defining how to retrieve the data. The data position parameter can indicate a portion of the linguistic data to be processed, such as by values indicating numerical positions of starting and ending characters, or can have a special value that indicates all of the linguistic data. The input language parameter can have a value that indicates the natural language of the linguistic data or that indicates that the natural language is not known, in which case a linguistic service can be called to guess the language.

The result format parameter is a result parameter for providing information that can be used to return results of performing the linguistic service on linguistic data. The result format parameter can have a value that indicates a format and character set in which results are returned, such as Iso Latin1 plain text, UTF8 HTML, RTF, etc., or that indicates that results should be returned as an unformatted object, referred to herein as "raw format".

Request abstract object 350 can be modified to further specify methods and parameters, and can thus be used to implement a new type of linguistic service. FIG. 10 illustrates three examples, for tokenization, dictionary lookup, and text extraction, but many other types of linguistic services could be implemented, including morphological analysis, part-of-speech tagging or disambiguation, low-level pattern extraction, stemming and lemmatizing, language identification, optical character recognition (OCR), speech recognition, lexicon lookup, translation assistance, summarization, annotation and glossing, information retrieval, shallow parsing, comprehension assistance, language-related knowledge management, indexation, idiom recognition, noun phrase extraction, verb phrase extraction, and various useful combinations of these services.

Tokenization request object 352 is a descendant of request abstract object 350, but specified to invoke a tokenization service. Tokenization request object 352 has been specified by adding a tokenizer type parameter indicating a type of tokenization to be performed. The types of tokenizers available could include a basic language-independent tokenizer that uses spaces and punctuation marks to tokenize and language-specific pattern-based tokenizers for a number of languages, such as FSM tokenizers.

Dictionary lookup request object 354 is a descendant of request abstract object 350, but specified to invoke a dictionary lookup service. Dictionary lookup request object 354 has been specified by adding a result language parameter, a tokenizer type parameter, a morphological analyzer type parameter, a disambiguator type parameter, and a dictionary lookup type parameter. The result language parameter can indicate a language in which the results are provided, which will be different than the input language if the dictionary lookup service performs translation but can also be the same as the input language for lookup in a monolingual dictionary The tokenizer type parameter can be as in request object 352. The morphological analyzer type parameter can indicate a type of morphological analysis to be performed, such as FST analyzer. The disambiguator type parameter can indicate a type of disambiguation to be performed, such as Hidden Markov Model (HMM) based. The dictionary lookup type parameter can indicate the type of dictionary lookup to be performed, such as contextual lookup, full lookup, semantic, or another type.

Text extraction request object 356 is a descendant of request abstract object 350, but specified to invoke a text extraction service. Text extraction request object 356 has been specified by adding a tokenizer type parameter, a morphological analyzer type parameter, a disambiguator type parameter, and, a text extraction type parameter. The tokenizer, morphological analyzer, and disambiguator type parameters can be as in request object 354. The text extraction type parameter can indicate a type of text extraction to be performed, such as noun phrase extraction, verb phrase extraction, or any other type of phrase extraction.

As suggested in FIG. 10, many other descendants of request abstract object 350 for other linguistic services could be implemented by further specifying methods and parameters, and the descendants shown in FIG. 10 could also be further specified to produce lower level descendant objects for additional types of tokenizing, dictionary lookup, or text extraction.

C.5. Result Objects

Figure 11:
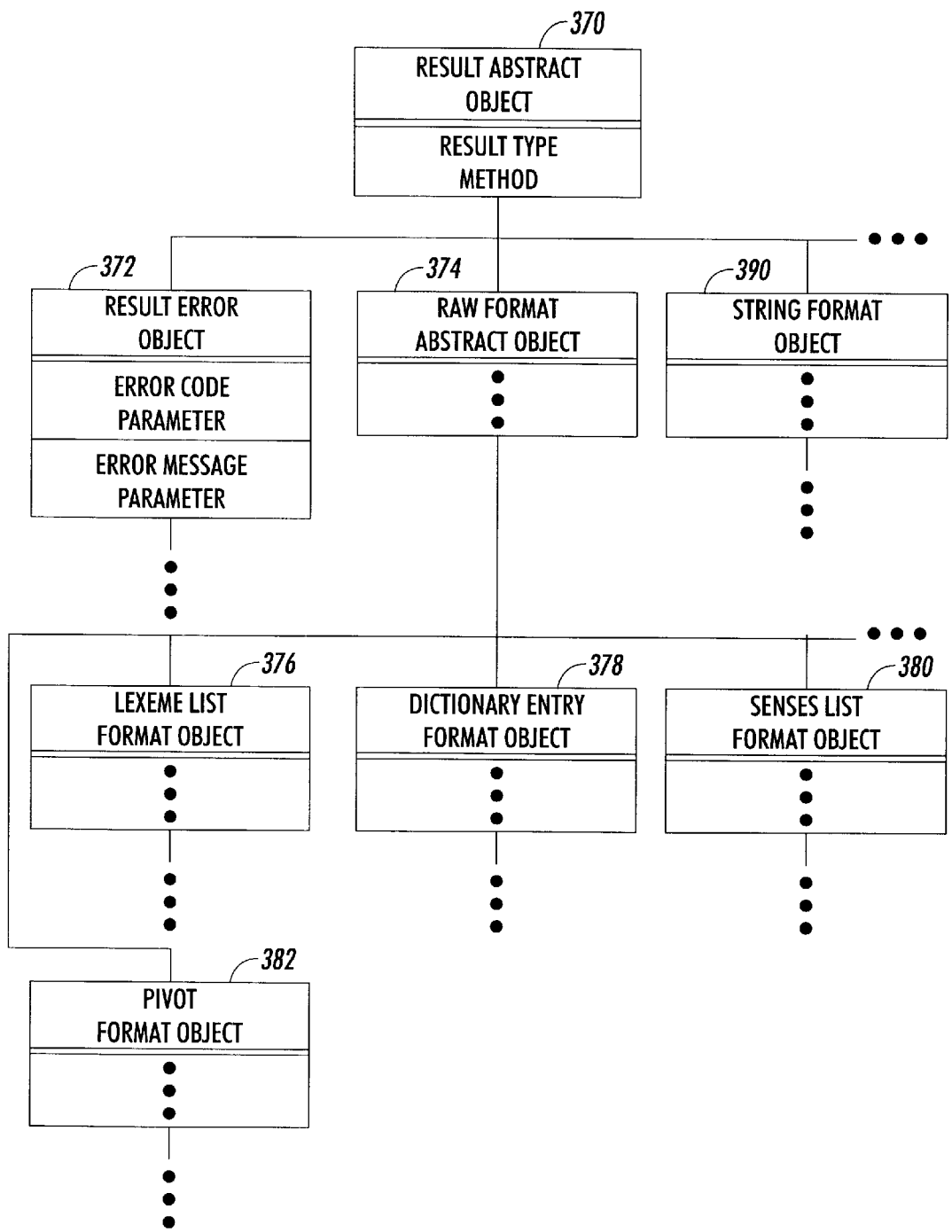
FIG. 11 is a schematic diagram of a hierarchy of result objects for implementing result objects in FIG. 4.

FIG. 11 illustrates XeLDA objects that can implement result objects in FIG. 4.

In FIG. 11, result abstract object 370 is a top-level result class that serves as an ancestor for lower-level result classes that define result format options. As such, it provides an abstract definition of linguistic service results and allows quick and easy addition of a new result format options by specifying it to obtain a lower-level result class that can define the new format option. In addition, result abstract object 370 allows a format option in which results are returned as objects in addition to various format options in which results are returned as. formatted strings.

As shown, abstract object 370 can include a result type method that returns a value indicating the type of the result object. The result type method can return a value that indicates a type of results, where the possible types include a type for error results, types of formatted objects, and a type for unformatted objects, referred to herein as "raw format".

Result abstract object 370 can be modified to further specify methods and parameters, and can thus be used to implement a new result format option. FIG. 11 illustrates three examples, for result error, for raw format, and for string format, but other types of result formats could be implemented.

Result error object 372 is a descendant of result abstract object 370, but specified to provide an error message. Result error object 372 has been specified by adding an error code parameter with a value indicating a type of error and an error message parameter with a string of characters that can be displayed to provide an error message.

Raw format abstract object 374 is a descendant of result abstract object 370, but can be further specified for different types of results in the raw format, referred to herein as "raw results". To a first approximation, each linguistics module can have at least one type of raw results, and some linguistic module such as shallow parsing have two or more. For example, types of raw results can include lexeme lists resulting from tokenizing, dictionary entries resulting from dictionary lookup, senses lists resulting from disambiguation.

Lexeme list format object 376, dictionary entry format object 378, senses list format object 380, and pivot format object 382 are descendants of raw format abstract object 370, but specified for different types of raw results. Each of these objects can also be descended from another class specific to its type, with lexeme list format object 378 descended from a lexeme list abstract object (not shown), and so forth. Pivot format object 382, as discussed below, can be used to obtain formatted results.

String format object 390 is an example of a container for a formatted result that can be produced from an instance of pivot format object 382 that receives a call to convert itself to a string. String format object 390 is a descendant of result abstract object 370, but specified to store a result formatted in a string format for display or printing. String format object 390 can also be descended from another class specific to handle string objects.

As suggested in FIG. 11, many other descendants of result abstract object 370 could be implemented by further specifying methods and parameters, and the descendants shown in FIG. 11 could also be further specified to produce lower level descendant objects.

C.6. Execute Methods

Figure 12:
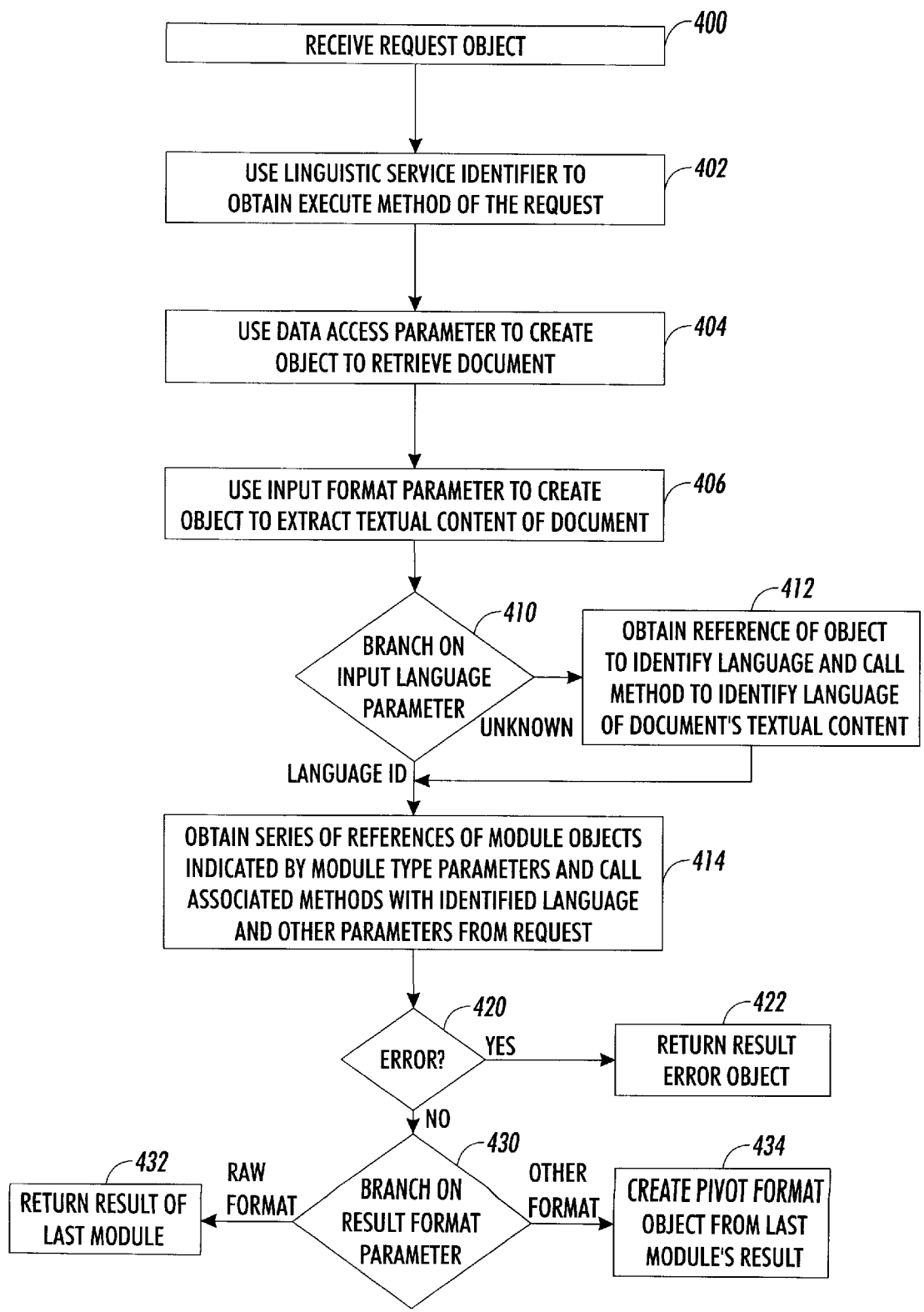
FIG. 12 is a flow chart showing an implementation of an execute method in FIG. 4.
Figure 13:
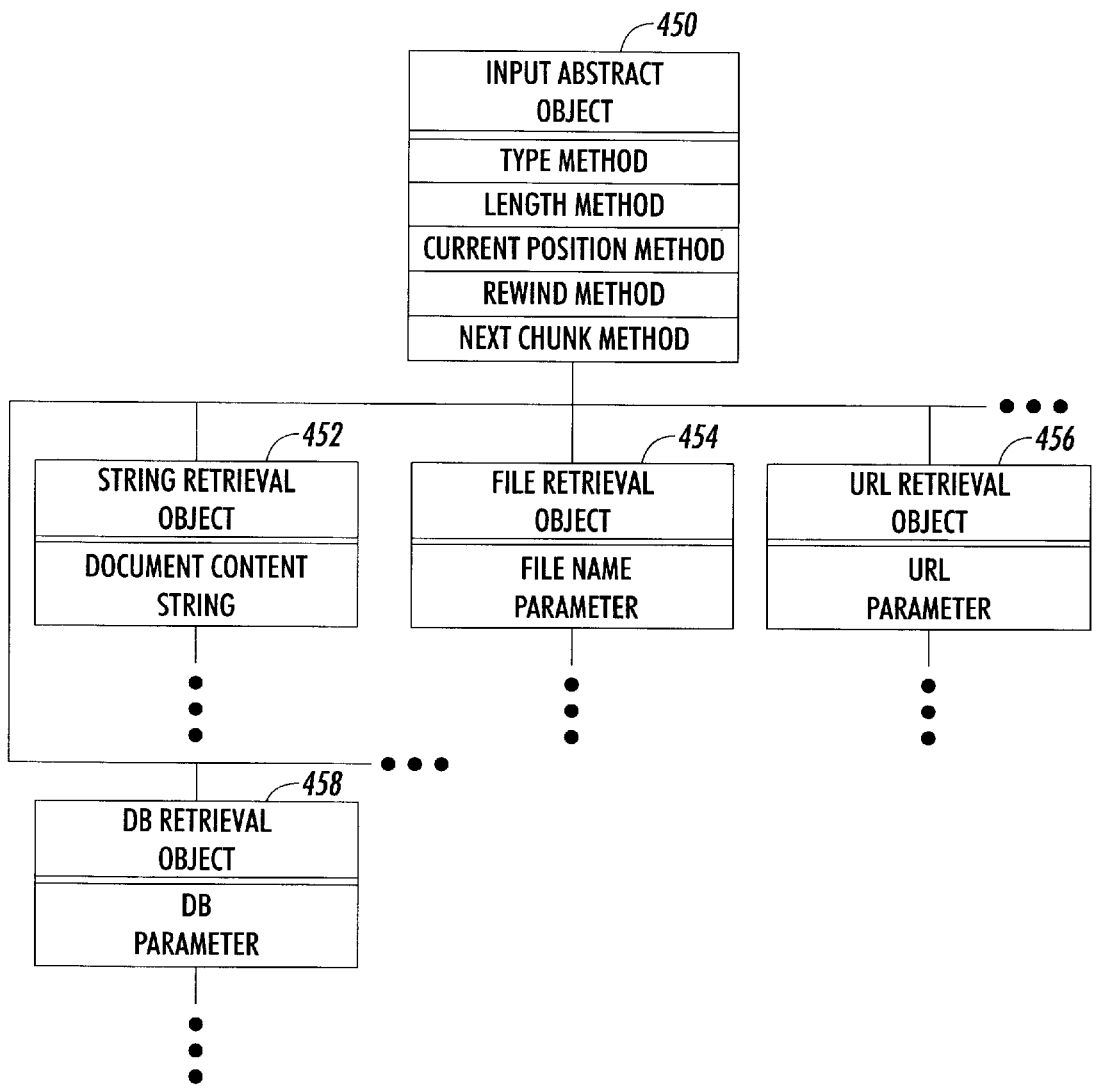
FIG. 13 is a schematic diagram of a hierarchy of input objects for retrieval of documents in FIG. 12.
Figure 14:
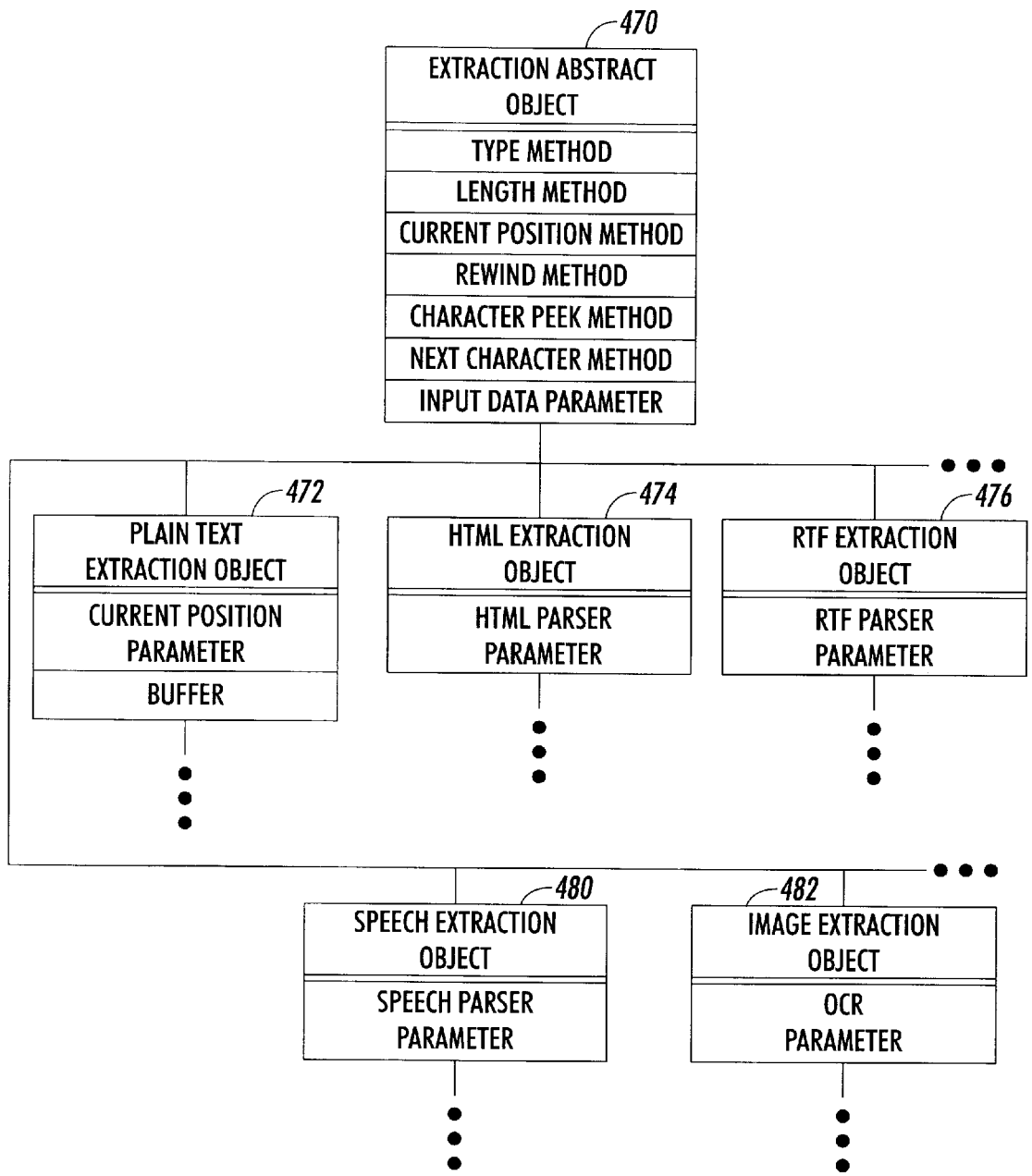
FIG. 14 is a schematic diagram of a hierarchy of extraction objects for extracting document textual content in FIG. 12.

FIG. 12 illustrates how execute method 230 in FIG. 4 can be implemented. FIG. 13 illustrates XeLDA objects that can be used in retrieving documents in FIG. 12. FIG. 14 illustrates XeLDA objects that can be used in extracting textual content from documents in FIG. 12.

FIG. 12 illustrates a generic response to a request object. The response includes a generic execute method that can be further specified to provide an execute method for any of various types of lower-level request object classes, including those illustrated in FIG. 10. The execute method is called from a kernel object's excuteRequest method or from the excuteRequest method of a direct link object.

Some of the general acts in FIG. 12 are common to the request object classes and can therefore be accessed by any of the linguistic services. Other acts must be specified to perform the appropriate linguistic service for one class.

In general, the hierarchical relation of request objects as shown in FIG. 10 makes it easy to create a new lower-level request object class for a new linguistic service. Similarly, the generic execute method in FIG. 12 lends itself to easy integration of new types of request objects and also to maximum reusability of parts of the execute method that can be applied to more than one class.

The act in box 400 begins upon receiving a request object which is an instance of a lower-level request object class, examples of which are shown in FIG. 10. The request object defines a linguistic service to be performed.

The act in box 402 obtains the request object's linguistic service identifier and uses it to call the executemethod for the appropriate lower-level request object class. The act in box 402 can be implemented by using the standard enumerateType statement of C++ to receive a unique identifier (UID) of the request object, which is then used to get the execute method of the request object. The subsequent acts in FIG. 12 can all be performed within the executemethod or by methods of objects created by the execute method.

The act in box 404 obtains the request objects data access parameter and uses it to create an object to retrieve a document. The document retrieved by the object created in box 404 could be a string of text in the request object, a string of text in memory, a local file, a remote file accessible by a protocol such as HTTP, FTP, etc., or any other form of document. The act in box 404 can be common to all the lower-level request object classes.

The act in box 406 then obtains the request object's input format parameter and uses it to create an object to extract textual content from the document retrieved by the object created in box 404. The object created in box 406 separates the textual content from structural or formatting information with which it may be mixed. The act in box 406 can be common to all the lower-level request object classes.

The act in box 410 then obtains the request object's input language parameter and branches based on whether the parameter indicates an unknown language. If so, the act in box 412 obtains the reference of an object to perform language identification and calls an associated method of the object to identify the language of the textual content extracted by the object created in box 406, using language identifier 226, one of linguistic modules 216 in FIG. 4. Language identification can be implemented using techniques described in copending, coassigned U.S. Pat. application Ser. No. 09/219,615 (Attorney Docket No. R/98027), entitled "Automatic Language Identification Using Both N-gram and Word Information" (referred to herein as the "Language ID Application"), incorporated herein by reference.

In the XeLDA implementation of language identification, some of the acts in FIGS. 5 and 6 of the Language ID Application are modified. The language corpora obtained in box 180 and the input text obtained in box 200 do not require most of the normalization operations described in relation to boxes 182 and 202 because previous operations ensure that they include only sequences of characters and also because diacritical marks and upper case characters are retained in order to take character set into account. In box 182, tokenizing is performed with a tokenizer specific to the language, whereas a generic tokenizer is used in box 202.

During the acts in boxes 184, 222, and 234, trigrams and short words are obtained by taking character set into account, so that upper case characters are converted to lower case in a way appropriate to each character set. The act in box 184 thus obtains trigram and short word probabilities for each of a number of (language+character set) pairs, and the acts in boxes 220 through 244 consequently relate not solely to languages, but to (language+character set) pairs, with the ID returned in box 244 identifying a language and a character set.

For a few languages, such as Chinese, Greek, Korean, and Hebrew (and probably for Japanese, were it included), short word probabilities are not obtained. In combining probabilities in box 240, the trigram probability for each of these languages is left unchanged, while the trigram and short word probabilities of other languages are simply added without averaging. Perhaps because Chinese, Korean, and the like, are very different from other languages, the comparison in box 242 has been found to generally produce correct results even though it seems countefintuitive to compare total trigram probability for one language with the sum of trigram and short word probabilities in other languages.

The XeLDA implementation also allows for weighted averages of trigram and short word probabilities, if weighted averages are beneficial. For example, a weight of 1.0 can be set for the trigram probability of each language that does not have short word probabilities.

Once a language identifier has been obtained, the act in box 414 obtains the request object's module type parameters and other specified parameters as illustrated for request objects 352, 35, and 356 in FIG. 10. The act in box 414 obtains a series of references of module objects indicated by the module type parameters. Then the act in box 414 can call the associated method of each object in the series, which in turn can call one of the linguistic modules 216 in accordance with the identified language from box 410 or box 412 and in accordance with other specified parameters from the request object. For example, if the request object is an instance of dictionary lookup request object 354, the appropriate types of tokenizer, morphological analyzer, disambiguator, and dictionary lookup could be called to retrieve, for each word in the linguistic data, a counterpart word in the language indicated by the request language parameter.

In calling the associated methods, the act in box 414 can provide the data position parameter to an associated method of the first object so that its module is called with the linguistic data on which the linguistic service is to be performed. Each object's module can then provide its results to the module called by the following object in the series, with the results from the module called by the final object being the result of the linguistic service.

The act in box 414 can be implemented specifically for each of the lower-level request object classes.

The act in box 420 branches based on whether the result from box 414 is an error. If so, the act in box 422 returns a result error object which is an instance of object 372 in FIG. 11. The result result error object can, for example, present an error message to the user.

If the result is not an error, the act in box 430 obtains the request object's result format parameter and branches based on its value. If the result format parameter has the raw format value, the act in box 432 returns the result of the module called by the last object in the series as a raw result, which will be an instance of one of the descendants of raw format abstract object 374 in FIG. 11. The result format parameter is likely to have the raw format value when the result will be provided as input to another part of the application, due to partial processing or through storage in a database.

If the result format parameter has a value indicating a format and character set, the act in box 434 creates a pivot format object from the result of the module called by the last object in the series. The pivot format object can then generate a formatted result, as discussed in greater detail below. The formatted result can, for example, be provided for printing or presentation on a display screen.

It should be noted that the technique in FIG. 12 makes temporary files unnecessary, because the result of any linguistic module can be held in memory. Also, the document retrieved by the object created in box 404 can have a different format and character set from those of the formatted result obtained by the pivot format object created in box 434.

FIG. 13 illustrates XeLDA objects that can be created to perform document retrieval in box 404 in FIG. 12.

In FIG. 13, input abstract object 450 is a top-level input class that serves as an ancestor for lower-level input classes that define ways in which input documents can be retrieved, "chunk by chunks". As such, it provides an abstract definition of how to retrieve a document and allows quick and easy addition of a new document retrieval procedure, perhaps from a new type of external document storage, by specifying it to obtain a lower-level input class that can define the new retrieval procedure. In addition, input abstract object 450 allows a procedure in which a string of characters in the request object are retrieved as the document, even though it is not necessary to provide the document with the request object.

As shown, abstract object 450 can include a type method that can be specialized to obtain the type of an object that relates to an input class, such as string, file URL, and so forth; a length method that can be specialized to obtain the length of a document in bytes, if any; a current position method that can be specialized to obtain the current position within a document being retrieved; a rewind method that can be specialized to return to the beginning of a document being retrieved; and a next chunk method for retrieving the next chunk of a document being retrieved. The methods of input abstract object 450 can all be default methods that must be specified for its descendants.

Input abstract object 450 can be modified to further specify methods and parameters, and can thus be used to implement a new document retrieval procedure. FIG. 13 illustrates four examples, for string retrieval, file retrieval, URL retrieval, and database retrieval, but many other types of retrieval procedures could be implemented with lower-level input classes. When a retrieval procedure is implemented, it is assigned a data access parameter value, so that an instance of the retrieval procedure's class is created in response to a request object whose data access parameter has the procedure's value. The retrieval procedure instance then retrieves a document, "chunk by chunk".

String retrieval object 452 is a descendant of input abstract object 450, but specified to retrieve a string of characters included within a request object. String retrieval object 452 has been specified by adding a document content string, a parameter that can carry the document.

File retrieval object 454 is a descendant of input abstract object 450, but specified to retrieve a document that is accessible with a file name in a database or other filing system. File retrieval object 454 has been specified by adding a file name parameter that provides the file name of the document to access.

URL retrieval object 456 is a descendant of input abstract object 450, but specified to retrieve a document that is accessible with a universal resource locator (URL) through a network. URL retrieval object 456 has been specified by adding a UJRL parameter that provides the URL.

DB retrieval object 458 is a descendant of input abstract object 450, but specified to retrieve a document that is accessible through a database (DB). DB retrieval object 458 has been specified by adding a DB parameter that provides the database handle of the document.

As suggested in FIG. 13, many other descendants of input abstract object 450 could be implemented by further specifying methods and parameters, and the descendants shown in FIG. 13 could also be further specified to produce lower level descendant objects.

FIG. 14 illustrates XeLDA objects that can be created to perform document content extraction in box 406 in FIG. 12. In addition to the objects shown in FIG. 14, character objects can be obtained to represent the extracted textual content, each with a character parameter indicating a character code, a position parameter indicating the characters position in a document, and a length parameter indicating the number of bytes necessary to encode this character in the document.

In FIG. 14, extraction abstract object 470 is a top-level extraction class that serves as an ancestor for lower-level extraction classes that define ways in which textual content can be extracted from a chunk of a document. AS such, it provides an abstract definition of how to extract document textual content and allows quick and easy addition of a new document content extraction procedure by specifying it to obtain a lower-level extraction class that can define the new extraction procedure.

As shown, abstract object 470 can include a type method that returns the type of an object; a length method that can be specialized to obtain the length of the textual content being extracted; a current position method that can be specialized to obtain the current position within a document; a rewind method that can be specialized to return to the beginning of a document; a character peek method for accessing any character within a document chunk without incrementing the current position; a next character method for accessing the next character following the current position in a document and then incrementing the current position; and an input data parameter that carries a reference to the instance of input abstract object 450 that will return the next chunk.

Extraction abstract object 470 can be modified to further specify methods and parameters, and can thus be used to implement a new document content extraction procedure. FIG. 14 illustrates five examples, for plain text extraction, HTML extraction, RTF extraction, speech extraction, and image extraction, but many other types of extraction could be implemented with lower-level extraction classes, including SGML, XML, a page description language such as Postscript, any format used by a word processor, and so forth. In each case, an extraction class separates the structure and formatting information from the textual content of the document, and keeps the textual content and the position in the document where the textual content was found. As a result, the document skeleton can be extracted or the textual content of a document can be replaced with new textual content.

When an extraction class is implemented, it is assigned an input format parameter value, so that an instance of the extraction class is created for each document retrieved in response to a request object whose input format parameter has the procedure's value. The extraction procedure instance then extracts textual content from its document chunk, character by character. Linguistic modules can then group words or sentences appropriately when called to perform operations on the document textual content.

Plain text extraction object 472 is a descendant of extraction abstract object 470, but specified to extract textual content from a plain text document chunk. As used herein, "plain text" means text without formatting, so that plain text data is the textual content itself. Plain text extraction object 472 has been specified by adding a current position parameter for indicating the current position within the document and a buffer that can carry a chunk extracted from the document.

HTML extraction object 474 is a descendant of extraction abstract object 470, but specified to extract textual content from an HTML document chunk. HTML extraction object 474 has been specified by adding an HTML parser parameter identifying an HTML parser that can be used, which can be implemented as an object.

RTF extraction object 476 is similarly a descendant of extraction abstract object 470, but specified to extract textual content from an RTF document chunk. RTF extraction object 476 has been specified by adding an RTF parser parameter identifying an RTF parser that can be used, which can also be implemented as an object.

Speech extraction object 480 is a descendant of extraction abstract object 470, but specified to extract the text transcription of a document in the form of recorded speech. Speech extraction object 480 has been specified by adding a speech parser parameter identifying a speech recognizer that can be used, which can also be implemented as an object.

Image extraction object 482 is a descendant of extraction abstract object 470 but specified to extact text from a document in the form of data defining an image. Image extraction object 482 has been specified by adding an optical character recognition (OCR) parameter identifying an optical character recognizer that can be used, which can also be implemented as an object.

As suggested in FIG. 14, many other descendants of extraction abstract object 470 could be implemented by further specifying methods and parameters, and the descendants shown in FIG. 14 could also be further specified to produce lower level descendant objects.

C.7. Result Format Methods

Figure 15:
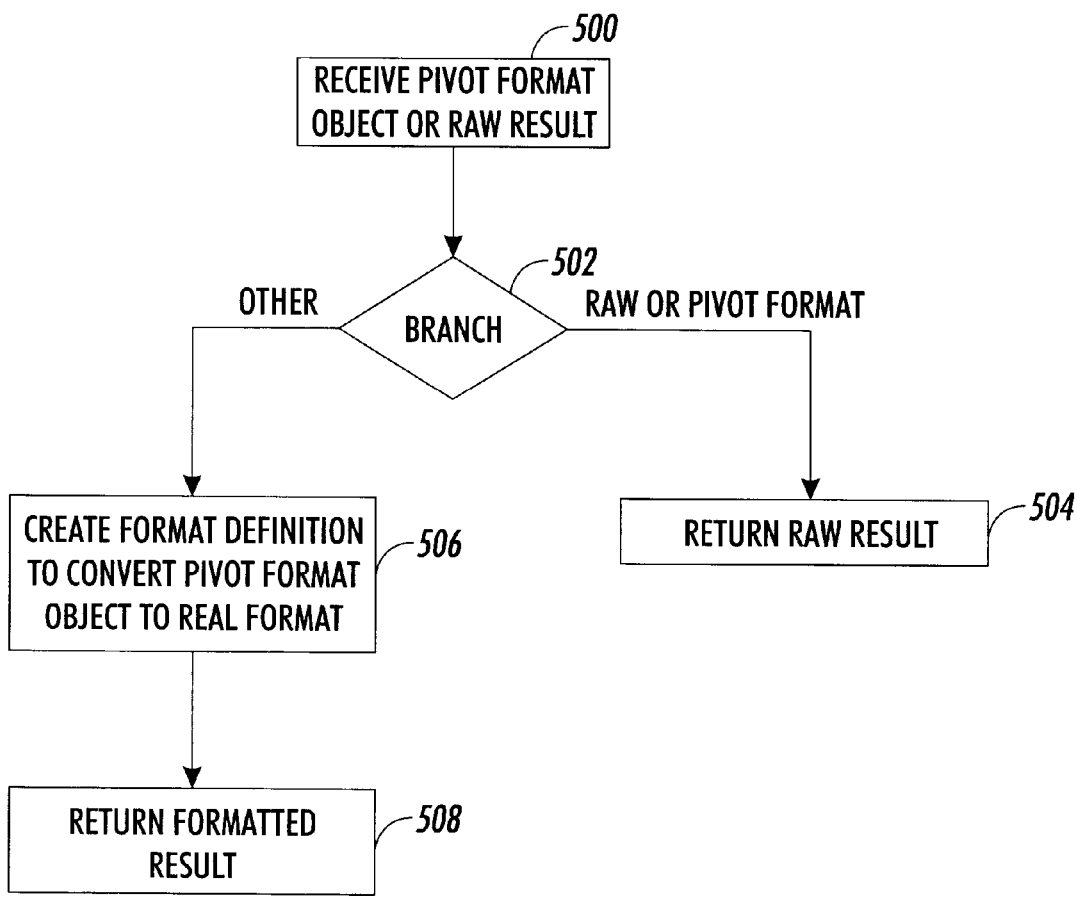
FIG. 15 is a flow chart showing an implementation of a format result method in FIG. 4.
Figure 16:
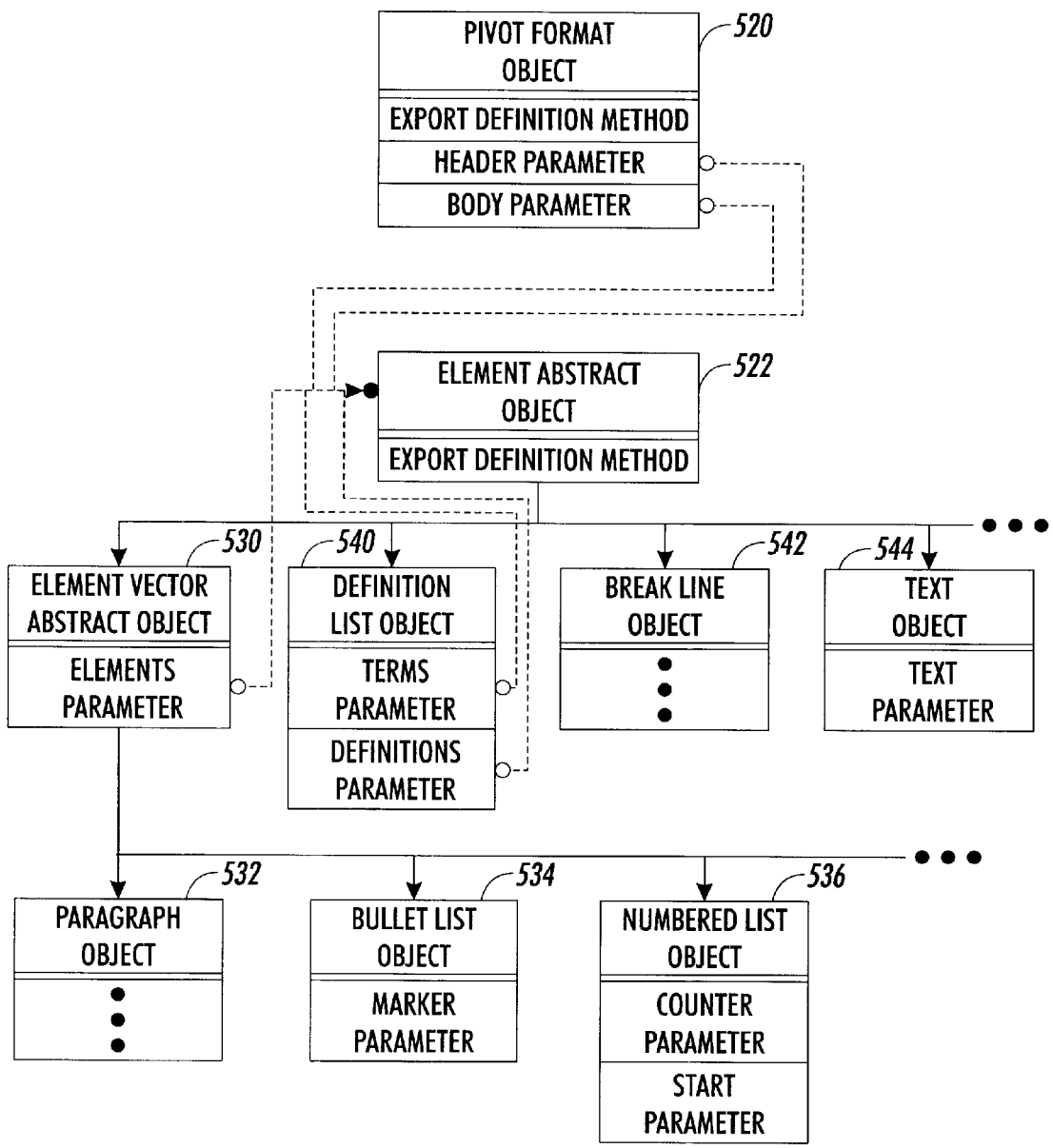
FIG. 16 is a schematic diagram of a pivot format object that can be obtained in FIG. 15.
Figure 17:
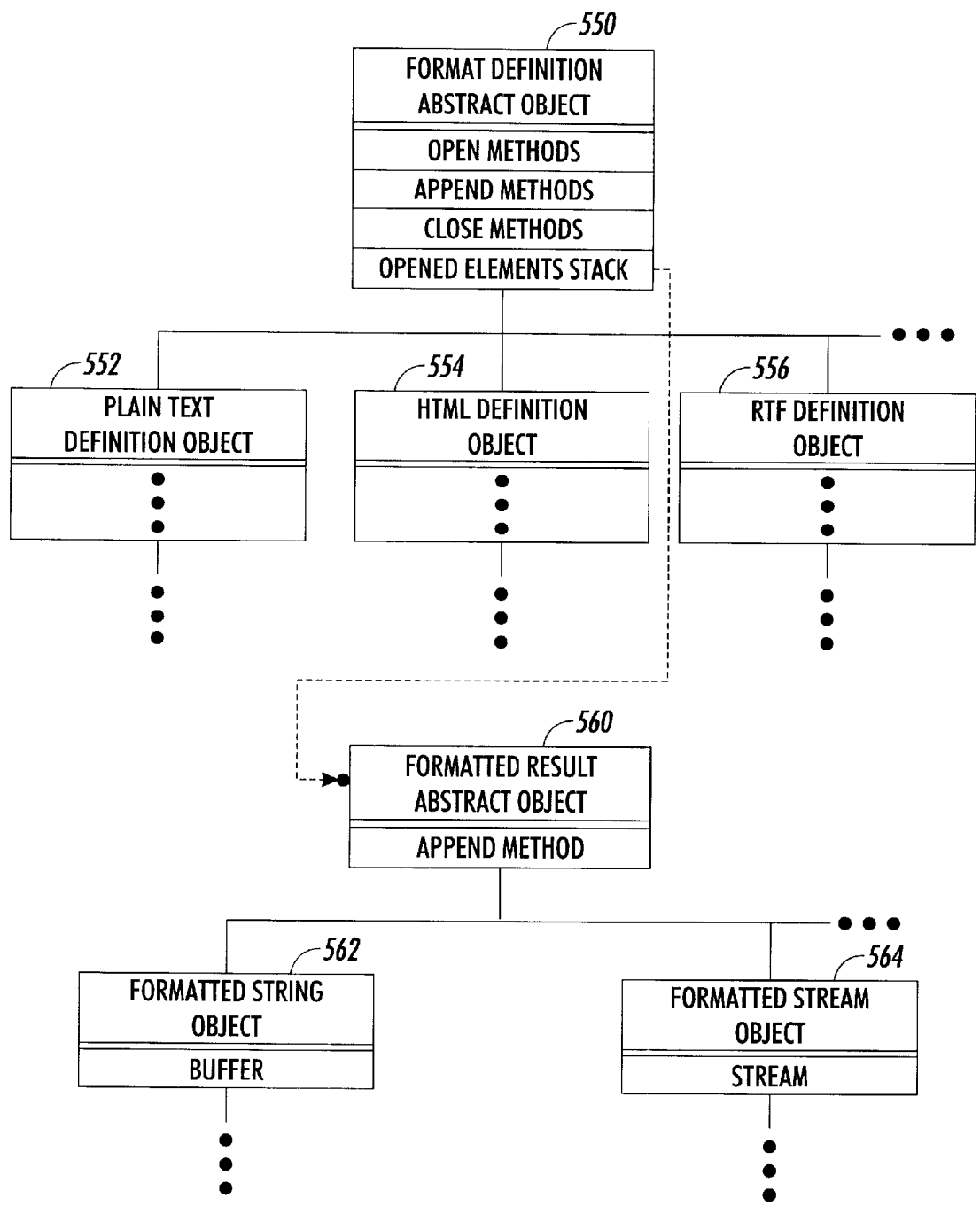
FIG. 17 is a schematic diagram of a hierarchy of format definition objects that can be used in FIG. 15 and a hierarchy of formatted result objects that can be obtained in FIG. 15.

FIG. 15 illustrates how format result method 230 in FIG. 4 can be implemented. FIG. 16 illustrates XeLDA objects that can be used in converting a result object into a pivot format object in FIG. 15. FIG. 17 illustrates XeLDA objects that can be used in converting a pivot format object to a real format in FIG. 12.

FIG. 15 illustrates a generic format result method that can be performed on results returned in boxes 432 and 434 in FIG. 12. The method shown in FIG. 15 can be referred to as an auto-formatting service, and it can convert any object to a sequence of characters or instructions to be directly printed or presented on a display screen, if appropriate.

The act in box 500 begins upon receiving a pivot format object from box 434 or a raw result from box 432.

The act in box 502 branches based on the result format parameter of the current request object, which is an instance of a subclass of request abstract object 350.

If the result format parameter of the current request object is set to raw or pivot format, the act in box 504 simply returns the result received in box 500 without performing any conversion.

If the result format parameter is set to any other value, the act in box 506 uses the result format parameter to create an instance of a format definition, such as HTML, RTF, plain text, etc. This object is then used to convert the pivot format object from box 500 to a real format. The act in box 508 then returns the formatted result.

The acts in boxes 504, 506, and 508 can be implemented separately from the execute method of a request object class, because they are independent of the linguistic service that produced the results being formatted.

FIG. 16 illustrates XeLDA objects in a pivot format representation of a structured document that can be received in box 500 in FIG. 15.

In FIG. 16, pivot format object 520 is a simple object, containing a collection of elements. Pivot format object 520 has an export method that is called with a format definition as described below and a header parameter and a body parameter, each of which is a collection of zero or more element objects, as suggested by the dashed lines to element abstract object 522. Element abstract object 522 is a top-level abstract class that serves as ancestor for lower-level element object classes that define types of elements of a document. As such, it provides an abstract definition of an element and allows quick and easy addition of new element types by specifying it to obtain a lower-level element class that defines the new element type. Like object 520, element abstract object 522 has an export method that is called with a format definition as described below. The export methods apply the format definition to produce a formatted result. The export method of abstract object 522 can be specialized to return a formatted result for a class of elements that is a descendant of abstract object 522.

Element abstract object 522 can be specialized to define various types of elements of a pivot format object, some of which are illustrated in FIG. 16.

Element vector abstract object 530 is a descendant of element abstract object 522 that is further specified to have an elements parameter that is a collection of zero or more element objects, as suggested by the dashed line from element vector abstract object 530 to element abstract object 522. Element vector abstract object 530 is also a top-level class in the sense that is serves as an ancestor for lower-level classes of element vectors. FIG. 16 shows three such descendants—paragraph object 532, bullet list object 534, and numbered list object 536. Bullet list object 534 illustratively has a marker parameter indicating a type of bullets. Numbered list object 536 illustratively has a counter parameter for indicating a type of counter, such as numeric, arabic, roman, etc., and a start parameter for indicating where to start the counter.

Another descendant of element abstract object 522 is definition list object 540, which has a terms parameter and a definitions parameter, each of which is a collection of zero or more element objects, as suggested by the dashed lines to element abstract object 522.

Other descendants of element abstract object 522 are break line object 542 for an end of line and text object 544. Text object 544 has a text parameter that indicates a string of characters. Text object 544 can also be descended from a style class with parameters indicating font, font size, foreground, background, and attributes of text.

As suggested in FIG. 16, many other descendants of element abstract object 522 could be implemented by further specifying methods and parameters, and the descendants shown in FIG. 16 could also be further specified to produce lower-level descendant objects. For example, elements such as images, hyperlinks, Java applets, and so forth could be implemented as descendants of element abstract object 522.

FIG. 17 illustrates XeLDA objects that can implement format definitions used in box 504 in FIG. 15 and formatted results returned in box 506 in FIG. 15. In FIG. 17, format definition abstract object 550 is a top-level definition class that serves as an ancestor for lower-level definition classes that define ways in which a pivot format object as shown in FIG. 16 can be converted to a formatted result object. As such, it provides an abstract definition of how to format a pivot format object and allows quick and easy addition of a new formatting class by specifying it to obtain a lower-level definition class that can define the new formatting procedure.

As shown, abstract object 550 can include open, append, and close methods that can be specialized to convert various components of a pivot format object, such as format, paragraph, break line, bullet list, header, definition list (into which terms and definitions may be appended), numbered list, body, style, and text. In addition, abstract object 550 can have an opened elements stack that includes pointers for use in backtracking through a tree of element objects.

Format definition abstract object 550 can be modified to further specify methods and parameters, and can thus be used to implement a new formatting class. FIG. 17 illustrates three examples, for plain text formatting, HTML formatting, and RTF formatting, but many other types of formatting procedures could be implemented with lower-level formatting classes, including SGML, XML, Postscript or other page description languages, any word processor format, and so forth.

When a format definition class is implemented, it is assigned a result format parameter value, so that an instance of the format definition class is created in response to a request object whose result format parameter has the same format definition class value. The format definition class instance is used in box 504 in FIG. 15.

Plain text definition object 552, HTML definition object 554, and RTF definition object 556 are descendants of format definition abstract object 550, but specified to format a plain text document, an HTML document, and an RTF document, respectively.

As suggested in FIG. 17, many other descendants of format definition abstract object 550 could be implemented by further specifying methods and parameters, and the descendants shown in FIG. 17 could also be further specified to produce lower level descendant objects. Examples could include SGML, XML, Postscript or other page description languages, any word processor format, and so forth, as noted above.

FIG. 17 also shows formatted result abstract object 560, a top-level formatted result class that serves as an ancestor for lower-level formatted result classes that define types of formatted result objects. As such, it provides an abstract definition of how to append formatted text to result objects and allows quick and easy addition of a new type of formatted results by specifying it to obtain a lower-level definition class that can define the new type.

As shown, abstract object 560 can include an append method that can be specialized to provide various ways of handling formatted results. Formatted result abstract object 560 can be modified to further specify methods and parameters, and can thus be used to implement a new type of formatted results. FIG. 17 illustrates two examples, for strings and streams.

Formatted string object 562 and formatted stream object 564 are instances of formatted result abstract object 560, but specified for a string and a stream, respectively. Formatted string object 562 has a buffer for holding a string being built and formatted stream object 564 has a stream for directly outputting the formatted result.

As suggested in FIG. 17, many other descendants of formatted result abstract object 560 could be implemented by further specifying methods and parameters, and the descendants shown in FIG. 17 could also be further specified to produce lower level descendant objects. For example, a class for database objects could also be defined.

In general, the hierarchical relation of format definition objects as shown in FIG. 17 makes it easy to create a new lower-level definition object class for a new formatting procedure. Similarly, the hierarchical relation of formatted result objects in FIG. 17 lends itself to easy integration of new types of formatted results.

C.8. Producing Executables

Figure 18:
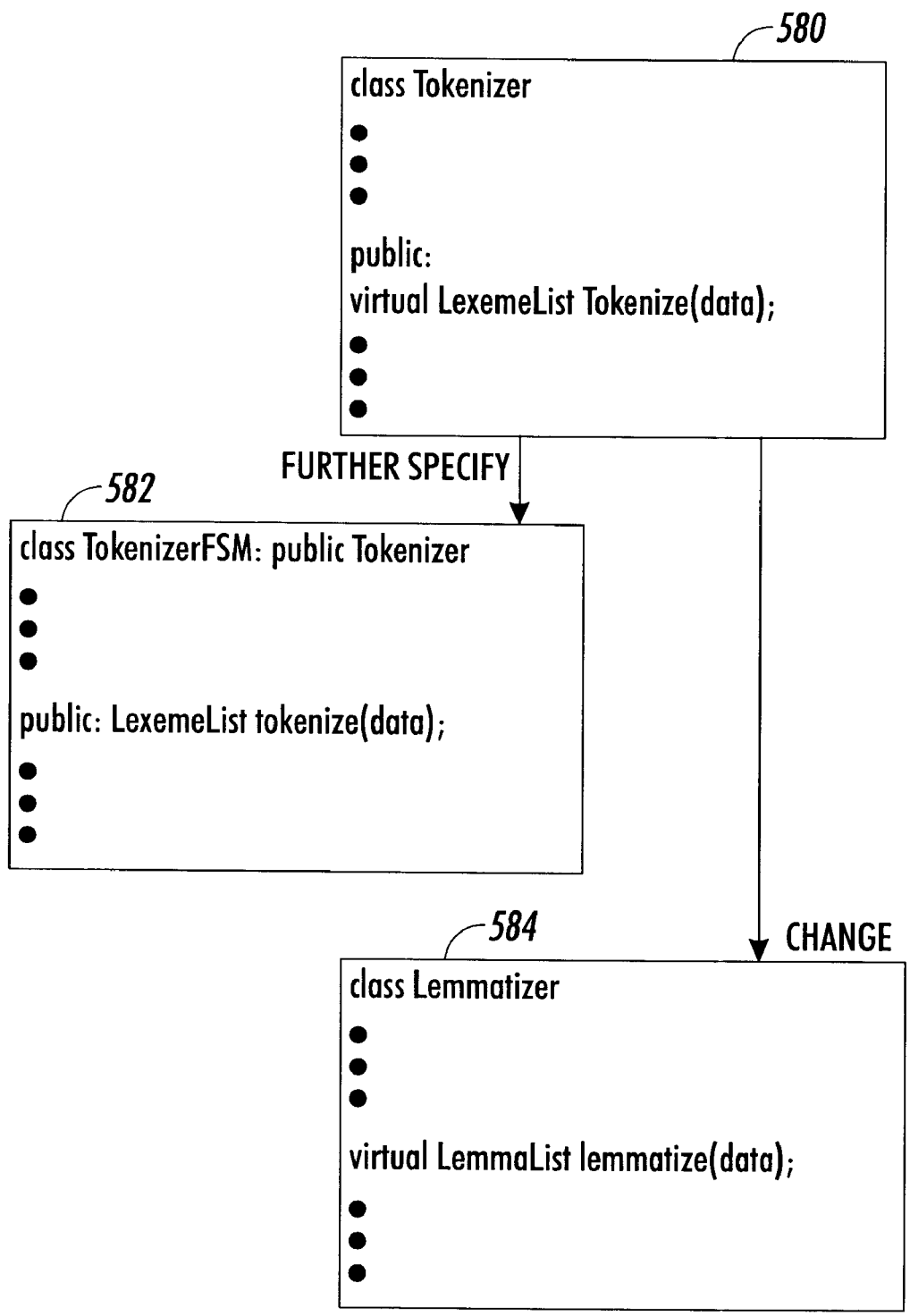
FIG. 18 is a schematic diagram showing two ways in which preexisting source code can be modified.

FIG. 18 illustrates examples of how preexisting source code 580 could be modified to obtain modified source code. The fragments of source code shown in FIG. 18 are illustrative of C++ code, but the same kinds of modifications could be made in other object-oriented languages.

Preexisting source code 580 is for an ancestor service that performs tokenization, while further specified source code 582 is for a descendant service that performs tokenization using an FSM. In contrast, changed source code 584 is for a service that performs lemmatization, a different service than tokenizing.

The fragments of preexisting source code 580 include public methods, meaning methods that can be seen by a user of a descendant, and virtual methods. A virtual method can be overridden in a descendant by a method that has the same name and parameters as the virtual method in the ancestor.

The "tokenize" method of preexisting source code 580 has been further specified to obtain the "tokenize" method of source code 582, which has the same name and the same input parameter, "data", and returns the same data type, "LexemeList". The tokenize method of preexisting source code 580 has been changed to obtain the "lemmatize" method of source code 584, which has the same input parameter, "data", but a different name and returns a different data type, "LemmaList".

Once modified source code has been obtained, an executable can be obtained using any conventional compiler or interpreter appropriate to the modified source code.

C.9. Variations

The implementation described above could be varied in many ways within the scope of the invention.

Executables have successfully been produced by the implementation described above by interactively modifying preexisting source code in the C++ programming language using programming environments running on personal computers and Unix workstations, but executables could be produced by modifying preexisting source code in other programming languages using other programming environments running on other machines, and by making modifications in other ways. Specifically, it would be possible to implement the invention using any other object-oriented programming language or using a non-object-oriented programming language. Modifications could be made in a variety of ways, including further specifying or changing preexisting source code in any appropriate way.

The implementation described above employs various objects from hierarchies of objects, including request objects, result objects, server link objects, kernel objects, input objects, extraction objects, pivot format objects, format definition objects, and formatted result objects, but the invention could be implemented with various other kinds of objects, whether or not in hierarchies, or without using objects. In general, the implementation described above employs objects from hierarchies that have only two or three levels, but the invention could be implemented with objects from multilevel hierarchies.

In the implementation described above, objects have parameters and methods as described, but the invention could be implemented with objects having a wide variety of different parameters and methods. For example, some parameters and methods described for abstract objects could instead be implemented as parameters and methods of specific objects.

Executables produced through compilation by the implementation described above have been successfully executed on the Sun, Linux, and various Windows platforms running on workstations, but executables could be produced in other ways, including interpretation, and could be executed on any Unix platform or other platforms running on other machines.

The implementation described above illustratively performs linguistic services such as tokenization, dictionary lookup, and text extraction using linguistic modules such as types of tokenizers, morphological analyzers, dictionary lookups, and language identifiers. The invention could be implemented to perform various other linguistic services, such as disambiguation (also known as part-of-speech tagging), low-level pattern extraction, stemming and lemmatizing, optical character recognition (OCR), speech recognition, lexicon lookup, translation assistance, text extraction, summarization, annotation and glossing, information retrieval, shallow parsing, comprehension assistance, language-related knowledge management, indexation, idiom recognition, noun phrase extraction, verb phrase extraction, and various useful combinations of these services using various other types of modules, such as disambiguators (or part-of-speech taggers), idiom recognizers, noun phrase extractors, glossers, shallow parsers, and any other function that can beneficially be implemented as a module.

The implementation described above retrieves a document chunk by chunk and extracts textual content from each chunk of the document to obtain an item of linguistic data on which a linguistic service is performed. The invention could be implemented by obtaining any of various other kinds of data from which to extract items of linguistic data. For example, items of linguistic data could be obtained from scanned images, from recorded speech, from character streams, from phoneme representations, or from various other kinds of data. Also, a document could be retrieved in various other ways rather than chunk by chunk.

The implementation described above uses finite state transducers and other finite state techniques for underlying linguistic resources, but other types of linguistic resources could be used.

The implementation described above has been extended to a number of languages, including Dutch, English, French, German, Italian, Portuguese, and Spanish, but could be extended to additional languages, including non-European languages.

In the implementation described above, acts are performed in an order that could be modified in some cases. For example, the order of the acts in FIG. 12 could be modified in several ways within the scope of the invention, such as by obtaining all parameters from the request object at the beginning or by performing a series of different linguistic modules on respective items of linguistic data or a single linguistic module on a series of items of linguistic data. Also, the input language identifier might be obtained at a different point in the sequence.

The Implementation described above uses currently available computing techniques, but could readily be modified to use newly discovered computing techniques as they become available.

D. Applications

The invention can be applied to provide a common development environment for developing software for linguistic applications. Examples include software to assist translation, multilingual authoring and information retrieval and software to perform comprehension assistance and document summarization.

E. Miscellaneous

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of producing executables for a system that performs linguistic services in response to requests, the system including a processor for executing the executables; the method comprising:

obtaining preexisting source code for an ancestor service; the ancestor service being an ancestor of a new linguistic service in a hierarchy within which an ancestor is less specified than its descendants;

modifying the preexisting source code to produce modified source code for responding to requests for the new linguistic service; each request identifying the new linguistic service and indicating linguistic data on which the new linguistic service is to be performed in response to the request; and using the modified source code to produce a service executable that, when executed by the processor in response to a request for the new linguistic service, performs the new linguistic service on the indicated linguistic data.

2. The method of claim 1 in which the act of modifying the preexisting source code comprises further specifying the preexisting source code to produce the modified source code.

3. The method of claim 1 in which the preexisting source code defines a top-level service class in an object-oriented programming language; the top-level service class including:

a service identifier whose value can identify one of the descendant linguistic services;

common parameters that are common to the descendants; and a default execute method that can be further specified to perform any of the descendant linguistic services.

4. The method of claim 3 in which the common parameters include input parameters providing information needed to obtain the linguistic data on which the new linguistic service is performed; the input parameters including:

an input format parameter indicating a format and character set of the linguistic data;

a data access parameter that includes data for accessing the linguistic data;

a data position parameter indicating a portion of the linguistic data to be processed; and an input language parameter having a value that indicates the language of the linguistic data or indicates that the language is not known.

5. The method of claim 4 in which the modified source code defines a lower-level service class in the object-oriented programming language, the lower-level service class being a descendant of the top-level service class; the lower-level service class including a specialized execute method for performing the new linguistic service, the specialized execute method:

creating a data retrieval object that obtains linguistic data in accordance with the data access parameter;

creating a content extraction object that extracts textual content in accordance with the input format parameter;

calling an associated method of a language identification object for identifying the language of the linguistic data in accordance with the input language parameter; and calling associated methods of one or more module objects for performing the new linguistic service on the part of the linguistic data indicated by the data position parameter.

6. The method of claim 5 in which the data retrieval object uses the data access parameter to create a specialized instance of an input data class that includes parameters and methods for accessing the linguistic data.

7. The method of claim 6 in which the specialized instance of the input data class includes a method that retrieves the linguistic data in chunks; the content extraction object using the input format parameter to create a specialized instance of an input data extraction class that includes parameters and methods for extracting textual content from the chunks.

8. The method of claim 3 in which the common parameters include result parameters providing information needed to return results of performing the new linguistic service on linguistic data; the result parameters including:

a result format parameter with a value indicating a format and character set in which results are returned or a value indicating that the results should be returned as an unformatted object.

9. The method of claim 8 in which the modified source code defines a lower-level service class in the object-oriented programming language, the lower-level service class being a descendant of the top-level service class; the lower-level service class including a specialized execute method for performing the new linguistic service, the specialized execute method, if the result format parameter's value indicates a format and character set:

creating a result conversion object for converting the results of the new linguistic service in accordance with the format and character set indicated by the result format parameter.

10. The method of claim 9 in which the result conversion object is a specialized instance of a pivot format class that provides a representation of a document; the result conversion object having a definition method that uses a format definition object for the format and character set indicated by the result format parameter to convert the result conversion object into the format and character set indicated by the result format parameter.

11. The method of claim 9, further comprising:

obtaining preexisting conversion source code for an ancestor conversion class; the ancestor conversion class being an ancestor of a new format definition class in a hierarchy within which an ancestor is less specified than its descendants;

modifying the preexisting conversion source code to produce modified conversion source code for defining the new format definition class for converting instances of the pivot format class to the format and character set indicated by the result conversion parameter; and using the modified conversion source code to produce a conversion executable that, when executed by the processor, creates an instance of the new format definition class that performs the new result conversion method;

the format definition object being an instance of the new format definition class.

12. The method of claim 11 in which the preexisting conversion source code defines a top-level result conversion class in the object-oriented programming language; the top-level result conversion class including:

a result identifier field whose value can identify one of the descendants of the top-level result conversion class.

13. The method of claim 3 in which the act of modifying the preexisting source code produces source code defining a lower-level service class in the object-oriented programming language, the lower-level service class including:

specific parameters that are specific to the new linguistic service; and a specialized execute method for performing the new linguistic service.

14. The method of claim 13 in which the new linguistic service responds to linguistic data in a first natural language by providing results in a second natural language different than the first; the specific parameters including:

a result language parameter indicating the second natural language.

15. The method of claim 13 in which the new linguistic service provides dictionary lookup services on untokenized text data; the specific parameters including:

module type parameters indicating types of linguistic modules that are employed to provide dictionary lookup services; the indicated types of linguistic modules including a type of tokenizer, a type of morpho-syntactic analyzer, a type of syntactic disambiguator, and a type of dictionary lookup.

16. The method of claim 13, further comprising:

in response to a request for the new linguistic service, operating the processor to execute the service executable to produce an instance of the lower-level service class; and operating the processor to perform the new linguistic service in accordance with the lower-level service class instance.

17. The method of claim 13 in which the act of using the modified source code to produce the service executable further produces a second service executable that uses the lower-level service class instance as an input, the method further comprising:

obtaining preexisting communication source code for an ancestor communication class; the ancestor communication method being an ancestor of descendant communication classes in a hierarchy within which an ancestor is less specified than its descendants;

modifying the preexisting communication source code to produce modified communication source code for a new communication method; the modified communication source code defining a descendant of the ancestor communication class; and using the modified communication source code to produce a communication executable that, when executed by the processor, performs the new communication method;

the lower-level service class instance being provided to the second service executable by the executing the communication executable.

18. The method of claim 17 in which the preexisting communication source code defines a top-level client-side class and a top-level server-side class in the object-oriented programming language; source code for the top-level client-side class being used to produce a client communication executable for execution by a processor of a client machine; source code for the top-level server-side class being used to produce a server communication executable for execution by a processor of a server machine; the act of modifying the preexisting communication source code comprising:

producing modified source code for a first lower-level client-side class for communicating the instances of the lower-level service class to the server machine and modified source code for a counterpart lower-level server-side class for receiving instances of the lower-level service class from the client machine; and producing modified source code for a second lower-level client-side class for directly providing instances of the lower-level service class as input for the processor of the client machine during execution of the second service executable.

19. An article of manufacture produced by the method of claim 1; the article of manufacture comprising:

a storage medium; and the service executable stored on the storage medium.

* * * * *